(12) United States Patent
Sugimoto

(10) Patent No.: US 8,656,299 B2
(45) Date of Patent: Feb. 18, 2014

(54) ELECTRONIC DISPLAY DEVICE, ELECTRONIC DISPLAY METHOD, ELECTRONIC DISPLAY PROGRAM, AND RECORDING MEDIUM

(75) Inventor: Hiroko Sugimoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 1388 days.

(21) Appl. No.: 11/587,270

(22) PCT Filed: Jul. 25, 2005

(86) PCT No.: PCT/JP2005/013553
§ 371 (c)(1),
(2), (4) Date: Oct. 23, 2006

(87) PCT Pub. No.: WO2006/011435
PCT Pub. Date: Feb. 2, 2006

(65) Prior Publication Data
US 2007/0168883 A1  Jul. 19, 2007

(30) Foreign Application Priority Data
Jul. 28, 2004 (JP) .................................. 2004-219733

(51) Int. Cl.
*G06F 3/048* (2013.01)

(52) U.S. Cl.
USPC ........... 715/776; 715/738; 715/739; 715/781; 715/200; 715/201

(58) Field of Classification Search
USPC ......................................... 715/776, 738, 739
See application file for complete search history.

(56) References Cited

U.S. PATENT DOCUMENTS

| | | | | |
|---|---|---|---|---|
| 5,463,725 A | * | 10/1995 | Henckel et al. | ............... 715/776 |
| 5,956,034 A | * | 9/1999 | Sachs et al. | |
| 6,486,895 B1 | * | 11/2002 | Robertson et al. | ............. 715/776 |
| 6,512,497 B1 | | 1/2003 | Kondo et al. | |
| 6,762,775 B2 | * | 7/2004 | Ho | ............................... 715/776 |

(Continued)

FOREIGN PATENT DOCUMENTS

| | | |
|---|---|---|
| JP | 2000-284883 | 10/2000 |
| JP | 2003-58081 | 2/2003 |
| JP | 2003-196012 | 7/2003 |

OTHER PUBLICATIONS

Kozak et al.; Printed Scholarly Books and E-book Reading Devices: A Comparative Life Cycle Assessment of Two Book Options; © 2003; IEEE; pp. 291-296.*

(Continued)

*Primary Examiner* — Doon Y. Chow
*Assistant Examiner* — Linh K Pham
(74) *Attorney, Agent, or Firm* — Wenderoth, Lind & Ponack, L.L.P.

(57) ABSTRACT

An electronic display device capable of displaying content written horizontally and written vertically in an electronic display device having a plurality of display screens. The electronic display device includes a plurality of display screens that are bound and that can be opened like a book, includes a content storage unit storing content to be displayed on the display screens, includes a content reading unit reading the content from the content storage unit, includes an opening direction recognizing unit recognizing a first opening direction or a second opening direction of the content on the display screen, and includes a display control unit arranging and displaying the content based on the first opening direction or second opening direction of the content.

6 Claims, 28 Drawing Sheets

(56) References Cited

U.S. PATENT DOCUMENTS

| | | | |
|---|---|---|---|
| 7,103,848 B2* | 9/2006 | Barsness et al. | 715/776 |
| 7,243,299 B1* | 7/2007 | Rubin et al. | 715/209 |
| 7,886,225 B2* | 2/2011 | Cope | 715/239 |
| 7,908,565 B2* | 3/2011 | Katsuranis | 715/781 |
| 2002/0116420 A1* | 8/2002 | Allam et al. | 707/526 |
| 2003/0110926 A1* | 6/2003 | Sitrick et al. | 84/477 R |
| 2004/0026605 A1* | 2/2004 | Lee et al. | 250/221 |
| 2004/0049743 A1* | 3/2004 | Bogward | 715/531 |
| 2004/0133847 A1* | 7/2004 | Iino et al. | 715/500 |
| 2004/0139400 A1* | 7/2004 | Allam et al. | 715/526 |
| 2005/0065860 A1* | 3/2005 | Alger et al. | 705/27 |
| 2012/0127642 A1* | 5/2012 | Rolus Borgward | 361/679.01 |
| 2013/0219320 A1* | 8/2013 | Seet et al. | 715/776 |

OTHER PUBLICATIONS

Harrison, Beverly; E-Book and the Furture of Reading; © 2000; IEEE; pp. 32-39.*

Han et al.; The Comparative Study of Mainstream E-Book Readers; © 2010; IEEE; 4 pages.*

Steimle et al.; CoScribe: Integrating Paper and Digital Documents for Collaborative knowledge Work. © 2009; vol. 2, No. 3; IEEE; pp. 174-188.*

* cited by examiner

| | |
|---|---|
| Arrange each page (using page sequence switching method | Left-opening mode : First page, second page, third page displayed on first display screen, second display screen, third display screen. |
| | Right-opening mode : First page, second page displayed on nth display screen, n-1 display screen, n-2 display screen. |
| Text type | English: Arrange left to right for both left-opening mode and right-opening mode. |
| Arrange manga blocks | Left-opening mode : Arrange left to right and top to bottom. |
| | Right-opening mode : Arrange right to left and top to bottom. |
| Arrange images of characters | Left-opening mode : Arrange left to right (left and right reversed in left-opening mode and right-opening mode ). |
| | Right-opening mode : Arrange right to left. |

*Fig. 17*

ELECTRONIC DISPLAY DEVICE, ELECTRONIC DISPLAY METHOD, ELECTRONIC DISPLAY PROGRAM, AND RECORDING MEDIUM

BACKGROUND OF THE INVENTION

1. Field of Invention

The present invention relates to an electronic display device including a plurality of display screens.

2. Description of the Related Art

An electronic display device is a device capable of displaying content such as letters and images and the like on a book-like display screen. A user can monitor the content without carrying a plurality of books by storing the various contents in the electronic display device. Japanese Laid-Open Patent No. 2003-196012 discloses an electronic display device having a two-screen display, which is capable of displaying a double-page screen display. FIG. 21 is a plan view showing the electronic display device disclosed in Japanese Laid-Open Patent No. 2003-196012. As shown in FIG. 21, a display screen 3 of an electronic display device 1 has a first display screen and a second display screen, and is configured so as to be capable of being opened and closed by pivoting on a hinge 4. The display screen 3 displays two-page content by means of the first and second display screens, and the display content is updated in two-page units when the user performs a page-turning operation. The user feels as if she is actually reading a book by means of the two-screen display. Furthermore, it is possible to set and change the display mode for horizontal writing and vertical writing and the like in the electronic display device 1.

BRIEF SUMMARY OF THE INVENTION

Japanese Laid-Open Patent No. 2003-196012 discloses an electronic display device having only a two-screen display, which is capable of displaying a double-page screen display. That is, Japanese Laid-Open Patent No. 2003-196012 does not in any way suggest an electronic display device in which a plurality of display screens are bound like a book. Furthermore, the electronic display device of this document includes a plurality of display screens but does not suggest any methods for setting or changing the display modes including "the left-opening mode", which the display screens will flip from right to left, or "the right-opening mode", which the display screens will flip from left to right.

An object of the present invention is to provide an electronic display device capable of displaying content in the left-opening mode or the right-opening mode in an electronic display device having a plurality of display screens.

In order to eliminate the problems mentioned above, a first invention of this application provides an electronic display device including: a plurality of display screens that are bound like a book and can be opened in a two-page spread; a memory unit for storing the content to be displayed on the display screens; a reading unit for reading the content from the memory unit; an opening-direction recognizing unit for recognizing a first opening direction or a second opening direction of the content on the display screens; and a display control unit for arranging and displaying content based on the first opening direction or second opening direction of the content.

In this electronic display device, the display screens span a plurality of pages, which a user can read by turning the pages as when actually reading a book. The content may include various types, such as musical scores, English language dictionary, manga (Japanese language graphic book), supras (Japanese language religious scriptures) and the like, and the content may be displayed on the display screens in the left-opening mode or the right-opening mode. For example, content of the left-opening mode includes musical scores, English language dictionaries and the like, and content of the right-opening mode includes manga, supras and the like. The opening direction recognizing unit first recognizes whether the content received by the reading unit is a content of the left-opening mode or the right-opening mode or the left-opening mode. For example, the opening direction recognizing unit recognizes the opening direction by input from the user, and recognizing the opening direction from information related to the opening direction included in the content. The display control unit arranges and displays the content on the display screens in accordance with the opening direction of the content. For example, the display control unit arranges and displays content of the left-opening mode with the page numbers ascending from the left side page to the right side page, and arranges and displays content of the right-opening mode with the page numbers ascending from the right side page to the left side page. Thus, in an electronic display device in which reading progress occurs by turning pages like a book, the content can be displayed in both the left-opening mode and the right-opening mode.

In descriptions pertaining to the Japanese language, typically, when characters are written horizontally, reading progress transpires from the left side page to the right side page in the left-opening mode, and when characters are written vertically, reading progress transpires from the right side page to the left side page in the right-opening mode. The opening direction recognizing unit first recognizes whether the content received by the reading unit is a content of the left-opening mode or the right-opening mode, that is, whether the Japanese language content is written in horizontal script or vertical script. Then, the display control unit arranges and displays the content on the display screens in accordance with the opening direction of the content. That is, in the case of that the content is the left-opening mode, the characters are arranged and displayed on the display screen in horizontal script, and in the case of that the content is the left-opening mode, the characters are arranged and displayed in vertical script. Thus, in an electronic display device in which reading progresses by turning the pages like a book, the content can be displayed in both the left-opening mode and the right-opening mode, that is, in both horizontal script and vertical script.

A second invention of the present application includes the electronic display device of the first invention, wherein the display screens include a first display screen to an nth display screen, and wherein the display control unit arranges and displays content in ascending order from the first display screen in the first opening direction, and arranges and displays content in descending order from the nth display screen in the second opening direction.

Here, the case is assumed where the first opening direction is the left-opening mode, and the second opening direction is the right-opening mode. The left-opening mode is set as a standard condition in which the first display screen, second display screen, . . . through the nth display screen are set sequentially in accordance with the page numbers from left-to-right. In the case of the right-opening mode, the nth display screen is set as the first page, and the n−1 display screen is set as the second page in the reverse order of the left-opening mode. Thus, the electronic display device arranges and displays content in an ascending sequence from the first display screen when the content is the left-opening mode. In contrast, the content is arranged and displayed in a descending sequence from the nth display screen when the content is the right-opening mode. Therefore, the electronic display device is capable of displaying content in both the left-opening mode and the right-opening mode.

Furthermore, the electronic display device can switch the display screen in which the content display starts in accordance with the left-opening mode and the right-opening mode. Thus, the user of the electronic display device can read and view the content without rotating the electronic display device itself or the display screen itself.

A third invention of the present application includes the electronic display device of the first invention, wherein the display screens include a first display screen to an nth display screen, and wherein the display control unit arranges and displays content in ascending order from the first display screen in both the first opening direction and the second opening direction, and reverses the top and bottom of the content in the first opening direction and the second opening direction.

In this case, although the content starts to display from the first display screen regardless of whether the content is the left-opening mode or the right-opening mode, the content may be arranged so as to reverse the top and bottom of the left-opening mode and the right-opening mode. Thus, when the content has been switched from the left-opening mode to the right-opening mode, the user can read the content in the right-opening mode by rotating the electronic display device itself or the display screen itself.

As described above, the electronic display device can display content according to both the left-opening mode and the right-opening mode by rotating the content.

A fourth invention of the present application includes the electronic display device of the first invention, wherein the content includes attributes indicating the opening direction of the content in the display screen, and wherein the opening-direction recognizing unit recognizes the opening direction of the content based on the attributes.

The opening direction recognizing unit can recognize the opening direction based on the attributes included in the content. Attributes include the content opening direction, content genre and the like. Content genre includes, for example, information such as musical score, English language dictionary, manga, supra and the like. The opening direction recognizing unit recognizes the content as the left-opening mode in the case of musical scores and English language dictionaries, and recognizes the content as the right-opening mode in the case of manga and supras.

A fifth invention of the present application includes the electronic display device of the first invention, wherein the opening-direction recognizing unit receives the opening direction information indicating the opening direction of the content from the user.

The opening direction recognizing unit can recognize the opening direction by receiving input from a user even when information related to the opening direction is not included in the content.

A sixth invention of the present application includes a recording medium for storing content readable by the electronic display device of the first invention and includes attributes indicating the opening direction of the content in the display screen.

The electronic display device can display content in accordance with the attributes of the content when the electronic display device reads the content stored on the recording medium.

A seventh invention of the present application includes an electronic display method in an electronic display device including a plurality of display screens bound like a book and can be opened in a two-page spread. This method comprises a memory step of storing the content to be displayed on the display screens; a reading step for reading the content stored in the memory step; an opening-direction recognizing step for recognizing a first opening direction and a second opening direction of the content on the display screen; and a display control step for arranging and displaying the content based on the first opening direction or second opening direction of the content. Effects identical to those of the first invention of the present application are obtained.

An eighth invention of the present application includes an electronic display program executed by an electronic display device including a plurality of display screens bound like a book and can be opened in a two-page spread, wherein the functionalities of the electronic display device are provided by: a memory unit for storing the content to be displayed on the display screens; a reading unit for reading the content from the memory unit; an opening-direction recognizing unit for recognizing a first opening direction or a second opening direction of the content on the display screens; and a display control unit for arranging and displaying content based on the first opening direction or second opening direction of the content. Effects identical to those of the first invention of the present application are obtained.

According to the present invention, content of the left-opening mode and the right-opening mode can be displayed in an electronic display device having a plurality of display screens.

BRIEF DESCRIPTION OF THE DRAWINGS

FIG. 17 shows information stored in the display control unit;

DETAILED DESCRIPTION OF THE INVENTION

Disclosure of the Invention

Since the electronic display device of the present application has a plurality of display screens bound like a book and can be opened in a two-page spread, a user can read by actually turning the pages. The content may include various types, such as musical scores, English language dictionary, manga, supras and the like, and the content may be displayed on the display screens in the left-opening mode, or the right-opening mode. For example, content of the left-opening mode includes musical scores, English language dictionaries and the like, and content of the right-opening mode includes manga, supras and the like. The electronic display device first recognizes whether the content received by the reading unit is the content of the right-opening mode, or the left-opening mode. Then, the electronic display device arranges and displays the content on the display screens in accordance with the opening direction of the content. For example, the electronic display device arranges and displays content of the left-opening mode with the page numbers increasing from the left side page to the right side page, and arranges and displays content of the right-opening mode with the page numbers increasing from the right side page to the left side page. Thus, when the content is the left-opening mode, the content can be read by turning the display screens from right to left, whereas when the content is the right-opening mode, the content can be read by turning the display screens from left to right.

First Embodiment

General Structure of the Electronic Display Device

Figure 1:
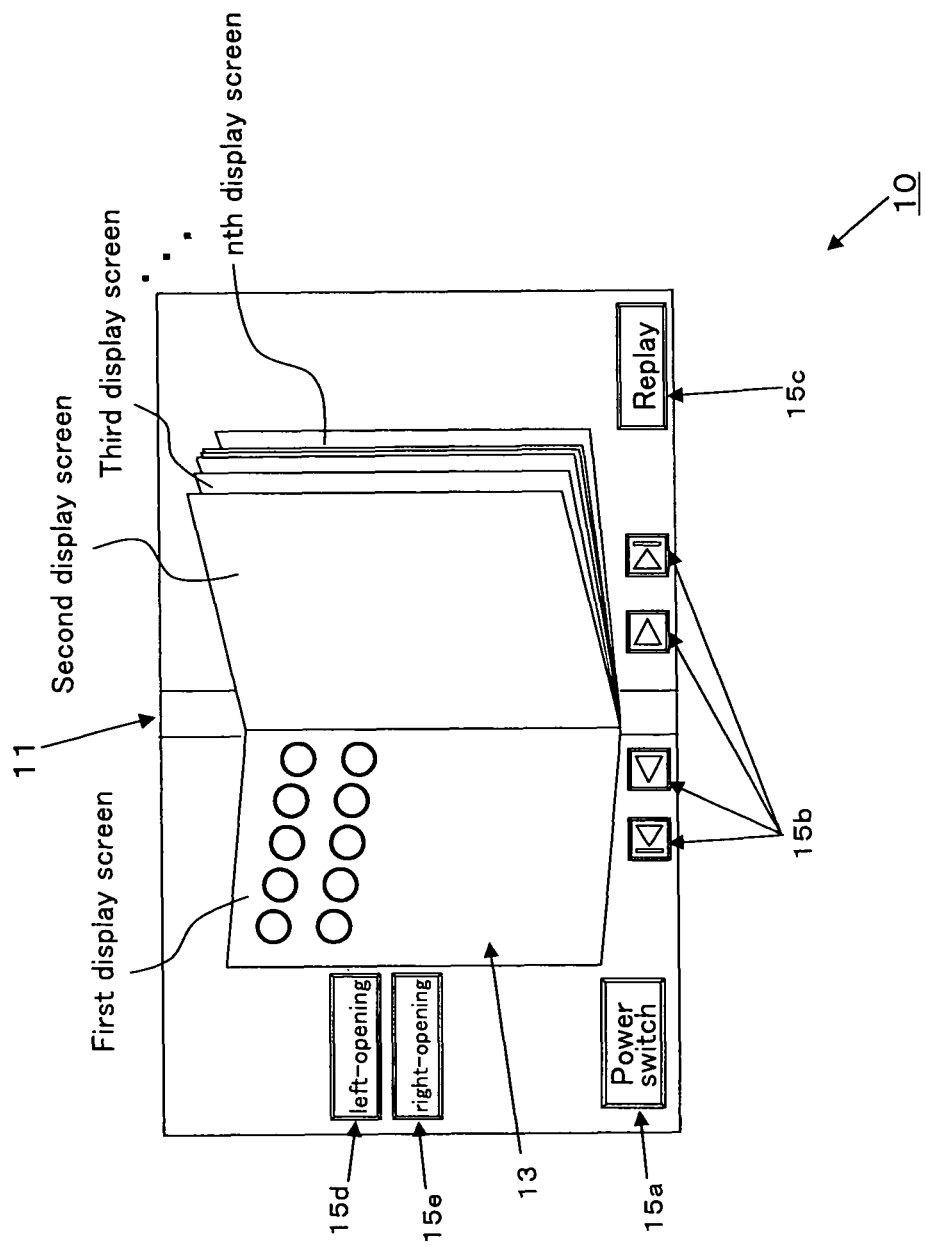
FIG. 1 is a plan view of an electronic display device of a first embodiment of the present invention.

FIG. 1 is a plan view of the electronic display device of a first embodiment of the present invention. The electronic display device 10 has a plurality of display screens 13 (first display screen, second display screen, . . . nth display screen) that are bound like a book and can be opened in a two-page spread. The electronic display device 10 can be closed by pivoting on a hinge 11. Various function buttons 15 (15a, 15b, 15c, 15d, and 15e) are provided on the electronic display device 10 that circumscribes the display screens 13. The various function buttons 15 include, for example, a power switch 15a for turning the electronic display device ON/OFF, rewind switch and fast-forward switch 15b for displaying next data and previous data on the display screens, replay switch 15c for replay content, and the left-opening mode switch 15d and the right-opening mode switch 15e for a user to specify switching the left-opening mode or the right-opening mode.

The electronic display device 10 displays content obtained from an external device and content previously stored internally on the display screens 13. The content also includes image data and text data. As previously mentioned, since the display screens 13 are a plurality of screens bound like a book and can be opened in a two-page spread, a user can read by actually turning the pages. Thus, the user can feel as if she is reading a book, magazine, and graphic book like manga actually held in the hand.

(Functional Structure)

Figure 2:
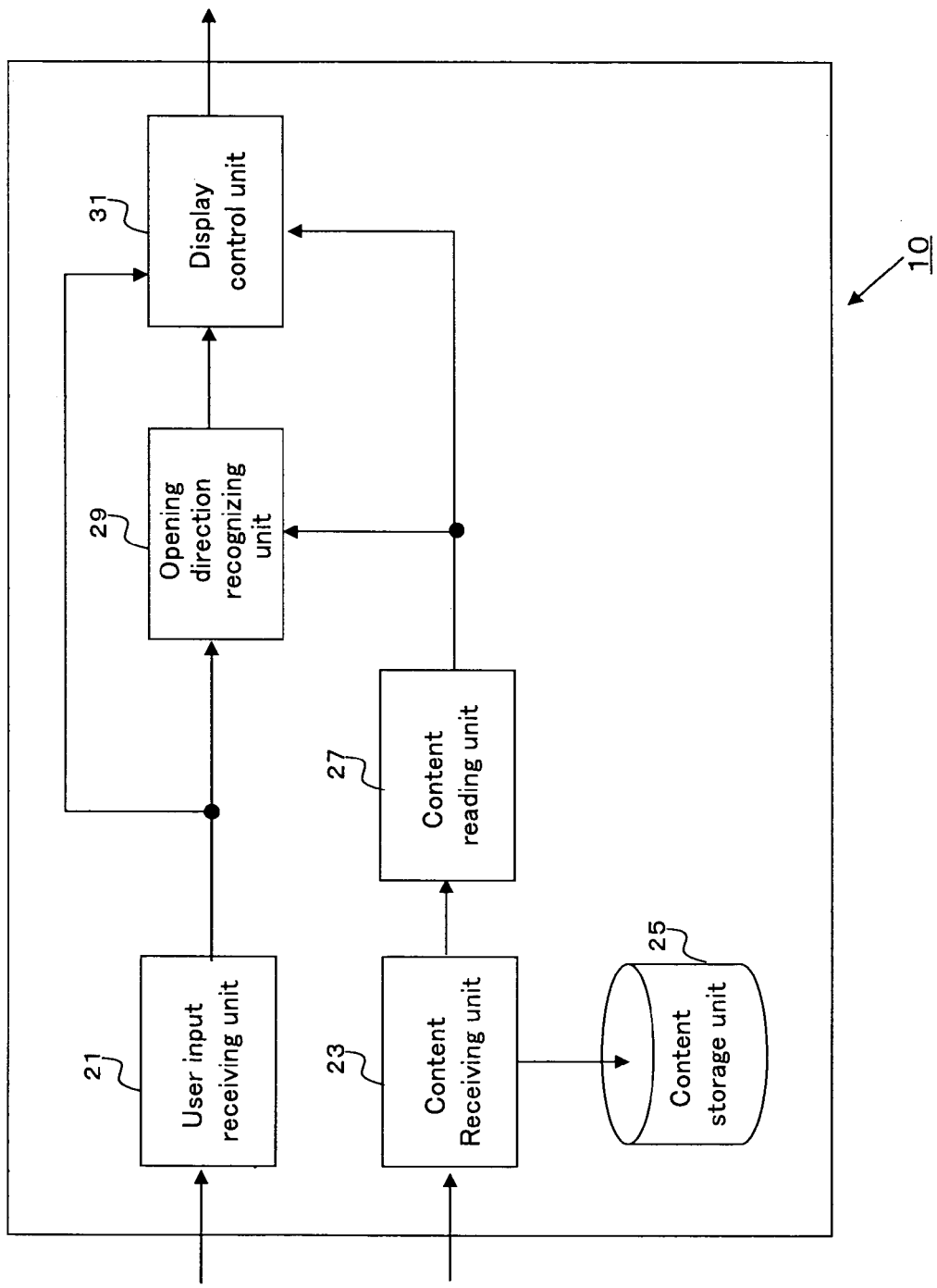
FIG. 2 is a block diagram showing the functional structure of the electronic display device 10.

FIG. 2 is a block diagram showing the functional structure of the electronic display device 10. The electronic display device 10 includes a user input receiving unit 21, content receiving unit 23, content storage unit 25, content reading unit 27, opening direction recognizing unit 29, and display control unit 31.

(1) User Input Receiving Unit

The user input receiving unit 21 receives input from a user through the various function buttons 15 and the like. For example, when a user presses the power switch 15a, the input information is sent to the display control unit 31, and the display control unit 31 turns ON/OFF the display screens 13. When a user presses the rewind switch and fast-forward switch 15b, the display control unit 31 displays the next data or previous data on the display screens 13. When a user presses the replay switch 15c the display control unit 31 starts regeneration of the content. When a user presses the left-opening mode switch 15d or the right-opening mode switch 15e, the display control unit 31 displays the content in accordance with the left-opening mode or the right-opening mode, respectively.

(2) Content Receiving Unit, Content Storage Unit, Content Reading Unit

The content receiving unit 23 receives content from outside the electronic display device 10. The content storage unit 25 stores content received by the content receiving unit 23. The content receiving unit 23 may also be configured by a recording medium, such as a memory card or the like that is detachably installed in the electronic display device 10. The content storage unit 25 may also store content beforehand, and not just store content received by the content receiving unit 23.

The content reading unit 27 reads the content from the content storage unit 25 in response to the user pressing the replay switch 15c. Then, the content reading unit 27 outputs the read content to the opening direction recognizing unit 29 and the display control unit 31.

(3) Opening Direction Recognizing Unit

The opening direction recognizing unit 29 recognizes the opening direction of the content to be displayed based on whether the user pressed the left-opening mode switch 15d, or the right-opening mode switch 15e. Alternatively, the opening direction recognizing unit 29 recognizes the left-opening mode or the right-opening mode of the content based on the content received from the content reading unit 27. For example, the content may include attribute information indicating whether the content is the left-opening mode or the right-opening mode, as described later. The opening direction recognizing unit 29 recognizes the opening direction based on the content attribute information. Then, the opening direction recognizing unit 29 outputs the opening direction of the content to be displayed to the display control unit 31.

(4) Display Control Unit

The display control unit 31 receives the content from the content reading unit 27, and arranges and displays the content on the display screens in accordance with the content opening direction. In the case of the left-opening mode content, the display control unit 31 arranges and displays the content so that the page number ascend from the left side to the right side. In the case of the right-opening mode content, the display control unit 31 arranges and displays the content so that the page numbers ascend from the right side to the left side. Particularly in cases of, for example, the Japanese language and the left-opening mode content, the display control unit 31 arranges and displays the content so that the characters are written horizontally from left to right within a page and the page numbers ascend from the left side to the right side. In the case of the Japanese language and the right-opening mode content, the display control unit 31 arranges and displays the content so that the characters are written vertically from the top to the bottom within a page and the page numbers ascend from the right side to the left side.

The display control unit 31 is assumed to memorize that, in the case of the left-opening mode, the display control unit 31 arranges and stores the content so that the page numbers on the right side are larger than the page numbers on the left side, and, in the case of the right-opening mode, arranges and stores the content so that the page numbers on the left side are larger than the page numbers on the right side. When the left-opening mode is standard, that is, the default opening direction, in the electronic display device, the display control unit 31 stores the content such that the first display screen, second display screen and the like respectively correspond to the first page, second page and the like in the left-opening mode, and stores the content such that the nth display screen, n−1 display screen and the like respectively correspond to the first page, second page and the like in the right-opening mode.

The display control unit 31 also stores the display rotation method and display screen display sequence switching method described later.

The types of text content are diverse, and include Japanese language, English language, Arabic language and the like. Thus, the display control unit 31 receives the content from the content reading unit 27, and recognizes the type of text of the content. Thereafter, the display control unit 31 displays the content in accordance with the type of text and the opening direction received from the opening direction recognizing unit 29, and displays the content as described above in the case of Japanese language content. In this case, the display control unit 31 stores beforehand the associations of the type of text, opening direction, and text layout method. For example, the characters are written horizontally from left to right within the page in the case of the left-opening mode of Japanese language content, the characters are written vertically from top to bottom within the page in the case of the right-opening mode of Japanese language content, the characters are written horizontally from left to right within the page in the case of both the left-opening mode and the right-opening mode of English language content, and the characters are written horizontally from right to left within the page in the case of Arabic language content and the like.

Alternatively, the display control unit 31 also may arrange content based on an opening direction received from the opening direction recognizing unit 29 and attribute information included in the content. In this case, the content has attribute information in addition to the opening direction, such as whether to arrange the content by horizontal script from left to right within the page, whether to arrange the content by horizontal script from right to left within the page, whether to arrange the content by vertical script and the like. For example, the attribute information in the content may record "Arabic literature", "the right-opening mode", "horizontal script from right to left within the page", "lines arranged from top to bottom". Based on this information, the opening direction recognizing unit 29 recognizes the content as the right-opening mode. The display control unit 31 arranges the content so that the page numbers ascend from the right side to the left side based on the right-opening mode, and arranges the characters by horizontal script from right to left within the page with the lines arranged from top to bottom. This method of arranging content is useful, particularly when the content arrangement is not necessarily constant, such as when the content is a mixture of text and graphics. The content attribute information also may be recorded on a style sheet, as described later.

In addition, the display control unit 31 can also arrange content according to an opening direction received from the user input receiving unit 21.

(Content Data Structure)

Figure 3:
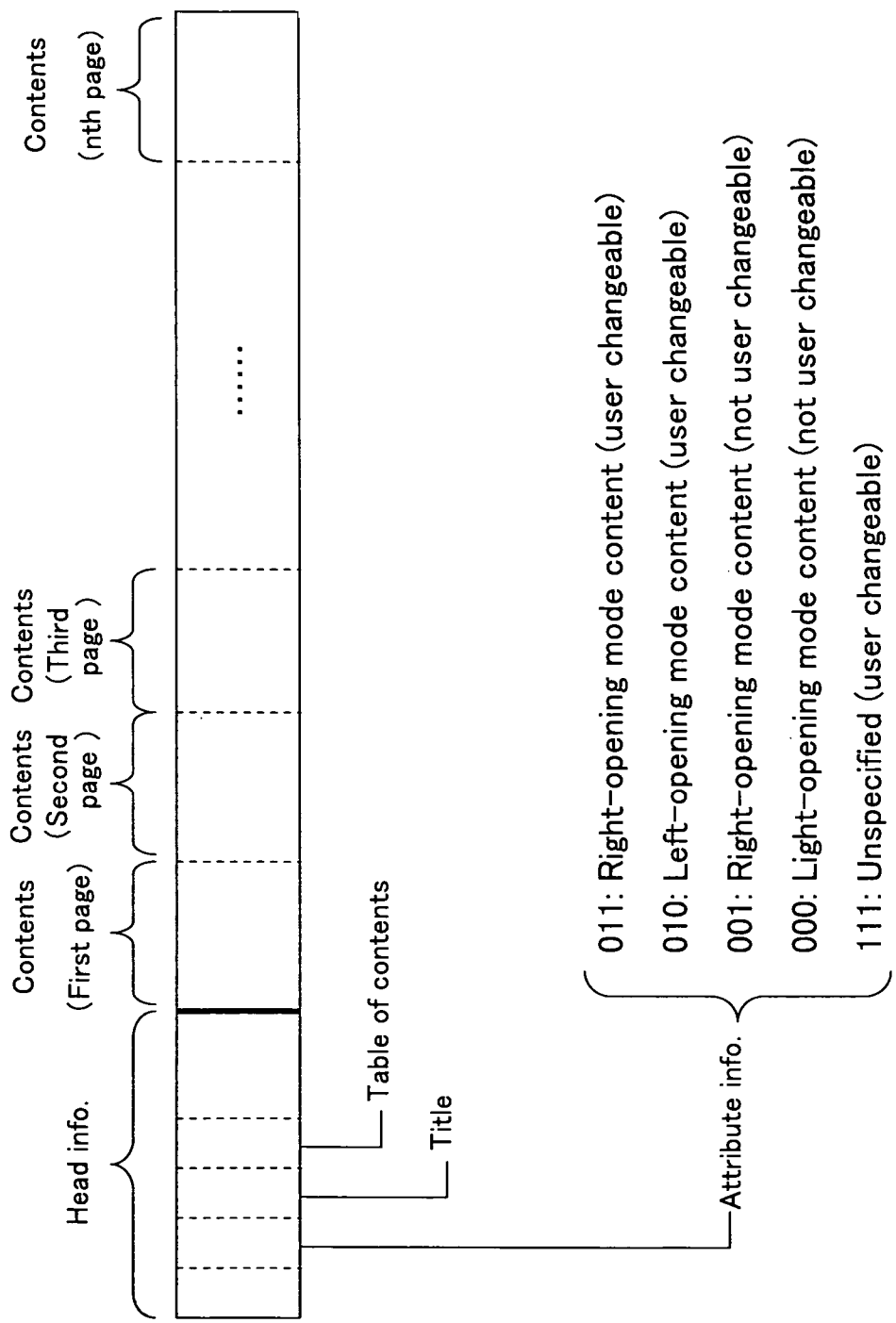
FIG. 3 illustrates an example of the content data structure.

FIG. 3 shows an example of the content data structure. As shown in FIG. 3, the content includes, for example, page information, and the content data of the following pages. A table of contents of the content, title of the content, and attribute information of the content and the like may be included in a header. Attribute information is information indicating whether the content is the left-opening mode content or the right-opening mode content. For example, attribute information can be expressed by a combination of bits, such that, whether or not content attributes are specified, is expressed by the first bit in FIG. 3, whether the opening direction is user modifiable is expressed by the second bit, and whether the left-opening mode or the right-opening mode is expressed by the third bit. The opening direction recognizing unit 29 receives the content from the content reading unit 27, and recognizes the opening direction of the content from the attribute information included in the content.

Attribute information may also include genres, such as musical score, English language dictionary, manga, supra and the like, in addition to the opening direction. The opening direction recognizing unit 29 recognizes the content as the left-opening mode when content genre is musical score and English language dictionary, and recognizes the content as the right-opening mode when the content genre is manga and supra. Furthermore, the attribute information may also include the text arrangement method within the page, the color, size and type of the font, and information for determining whether the left-opening mode or the right-opening mode is the standard state of the electronic display device 10. For example, the attribute information of a particular content records "the left-opening mode", "horizontal script from the left side to the right side within the page", "lines arranged sequentially from top to bottom", "MS Mincho", "black" and the like. The display control unit 31 displays the content on the display screens based on the font type and the opening direction recognized by the opening direction recognizing unit 29.

Attribute information indicating the opening direction of the content need not necessarily be included in the content. For example, the opening direction recognizing unit 29 can recognize the opening direction of the content by input from the user input receiving unit 21.

(Display by the Display Control Unit)

The display control unit 31 switches the arrangement and displays the content on the display screens according to whether the content is the left-opening mode or the right-opening mode. Methods for switching between left-opening mode and the right-opening mode include, for example, methods for switching the display sequence of the display screens, and methods for rotating and displaying the content while the display screen of the starting display is stationary. In this case, the content text type may be Japanese language, English language, Arabic language and the like, and the content genre may be musical score, manga and the like. Hereinafter, display methods are described by way of examples in Japanese language (refer to (A) below), English language (refer to (B) below), and English language manga (refer to (C) below).

(A) Japanese Language

The method for respectively displaying Japanese language in the left-opening mode and the right-opening mode are described first below by way of examples. In the case of Japanese language, the left-opening mode content is displayed so that the characters are written horizontally from left to right within a page, and the right-opening mode content is displayed so that the characters are written vertically from top to bottom within a page. In the examples below, the left-opening mode is the standard default opening direction.

Figure 4A:
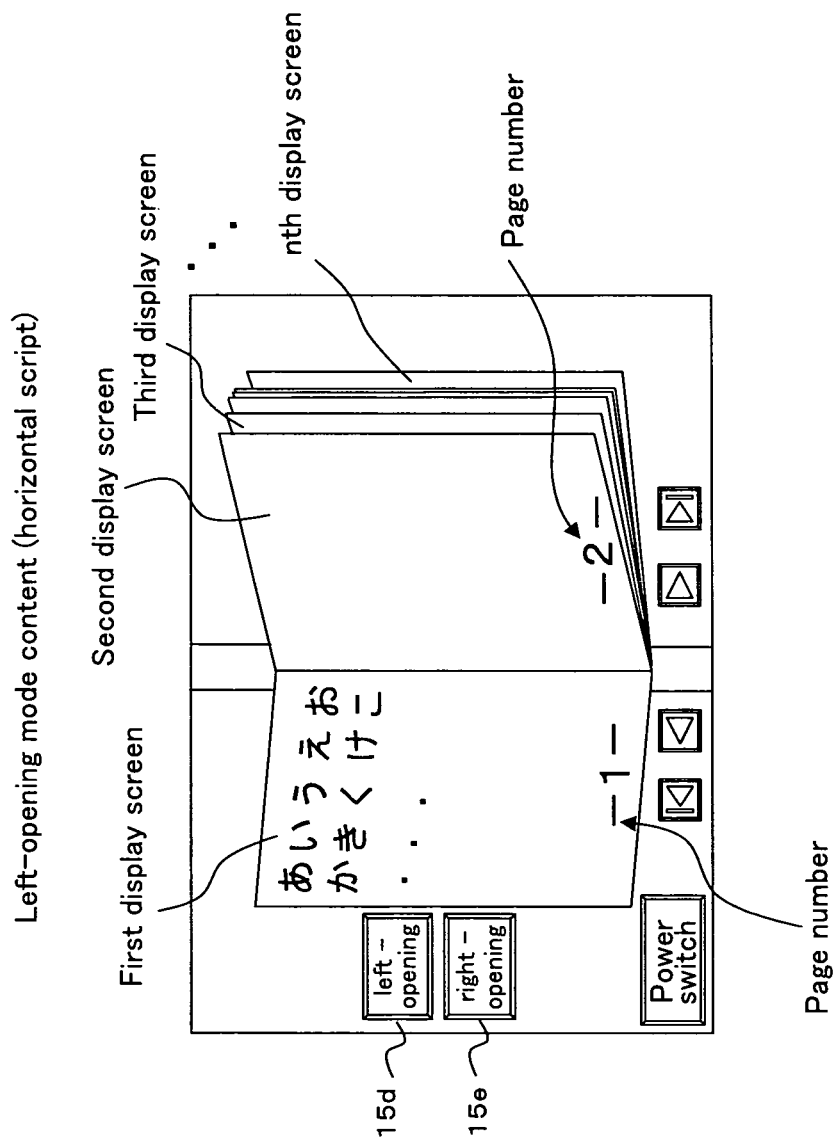
FIG. 4A illustrates a method for switching the left-opening mode and the right-opening mode by a display sequence switching method, and shows the left-opening mode content displayed (Japanese language)
Figure 4B:
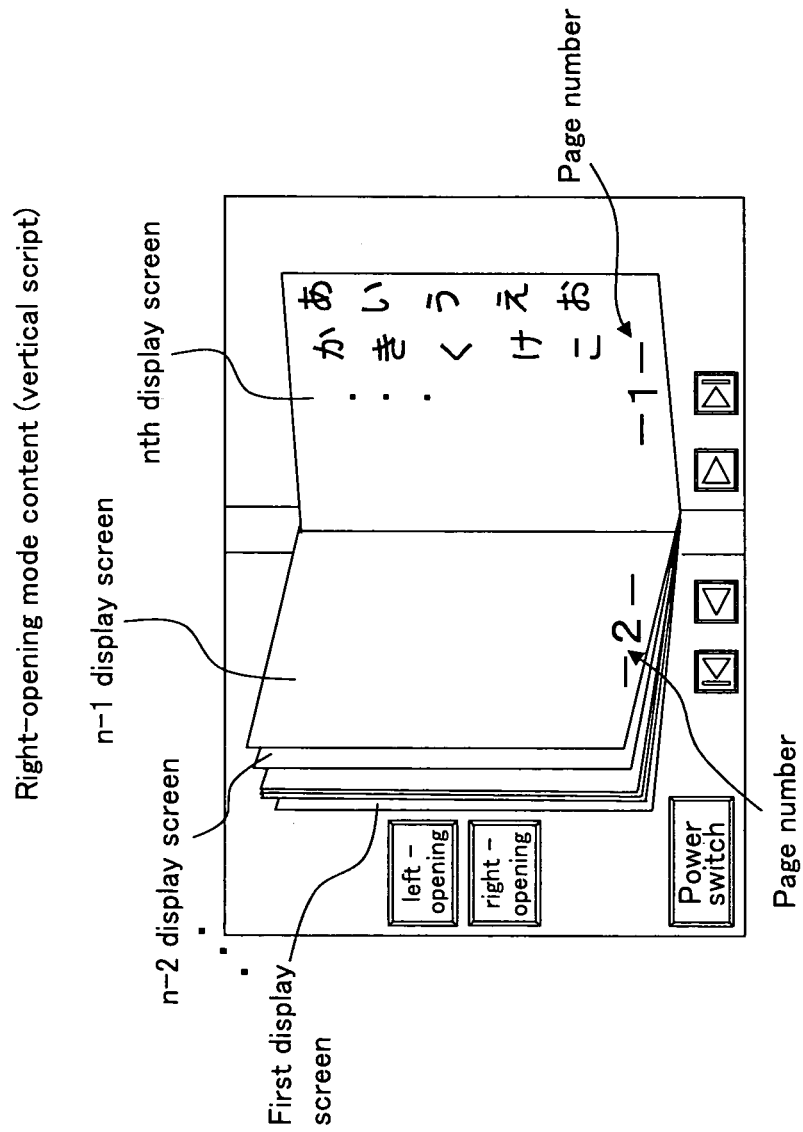
FIG. 4B illustrates a method for switching the left-opening mode and the right-opening mode by a display sequence switching method, and shows the content of the right-opening mode displayed (Japanese language)

(1) Method for Switching the Display Sequence of the Display Screens (1-1) Summary FIGS. 4A and 4B illustrate the method for switching between the left-opening mode and the right-opening mode by switching the display sequence. FIG. 4A shows a display of the left-opening mode content, and FIG. 4B shows a display of the right-opening mode content. According to this method, the left-opening mode content displayed in the sequence nth page, n–1 page, n–2 page and the like, is displayed in the sequence, first page, second page, third page and the like as the right-opening mode content, as shown in FIGS. 4A and 4B.

The left-opening mode as shown in FIG. 4A is the standard opening direction, and in this state the first, second, . . . nth display screens corresponds to the left-opening mode page numbers. That is, first page of the left-opening mode is the first display screen, the second page is the second display screen, . . . the nth page is the nth display screen. The display screen number is fixed for both the left-opening mode and the right-opening mode.

In the case of the left-opening mode content as shown in FIG. 4A, the content [a, i, u, e . . . ] is arranged in horizontal script from left to right within the page, and the content is arranged sequentially such that the page on the right side has a larger page number than the page on the left side. The first page, second page, . . . nth page are respectively displayed sequentially in the first display screen, second display screen, . . . nth display screen. The user specifies, for example, the display of the right-opening mode content as new content. In this case, the content reading unit 27 reads the right-opening mode content from the content storage unit 25. The opening direction recognizing unit 29 recognizes the content opening direction as the right-opening mode from the content attribute information, and outputs the right-opening mode confirmation to the display control unit 31. Based on the confirmation that the content is the right-opening mode, the display control unit 31 displays the first page of the content on the nth display screen, displays the second page of the content on the n–1 display screen, . . . and displays the nth page of the content on the first display screen, and displays the character are written vertically from top to bottom within a page as shown in FIG. 4B. That is, the display control unit 31 arranges and displays the content in ascending order from the first display screen in the left-opening mode, and arranges and displays the content in descending order from the nth display screen in the right-opening mode.

The opening direction recognizing unit 29 may also receive instructions to convert from the left-opening mode to the right-opening mode by a user from the user input receiving unit 21. The display control unit 31 may also convert from the left-opening mode of FIG. 4A to the right-opening mode of FIG. 4B based on instructions to convert to the right-opening mode.

Thus, the content can be displayed so as to correspond to both the left-opening mode content and the right-opening mode content by switching the display sequence of the display screens in the left-opening mode and the right-opening mode. In the case of this method, a user can read and view content without rotating the electronic display device itself or rotating the display screen itself.

(1-2) Examples

Figure 5:
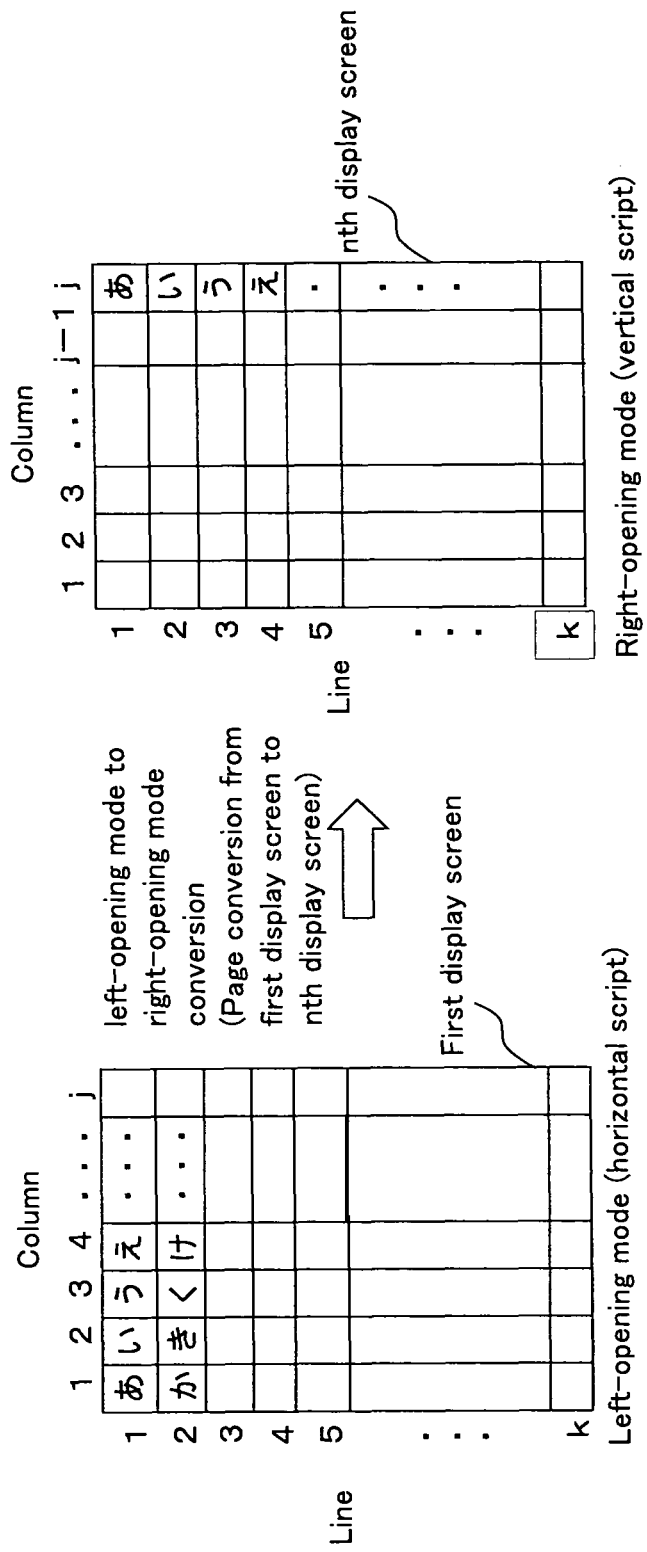
FIG. 5 shows the conversion from the left-opening mode to the right-opening mode by a method for switching the display sequence of the display screens (Japanese language)

The method for switching the display sequence of the display screens used by the display control unit 31 is described in detail below with reference to FIG. 5. FIG. 5 illustrates the conversion from the left-opening mode to the right-opening mode by the method for switching the display sequence of the display screens. In the example shown in FIG. 5, the display screen is configured from a matrix of (1-k: from 1 to k) lines by (1-j: from 1 to j) columns, in which one character is recorded in one section. In the case of the left-opening mode, the coordinates (1,1) of the first display screen is the origin point, and content [a, I, u, e, . . . ] is displayed in horizontal script from left to right within the page in the sequence (1,1), (1,2), (1,3), . . . (1,j–1), (1,j). When the first line display ends, the content of the second line [ka, ki, ku, ke . . . ] is displayed in horizontal script from left to right within the page in the sequence of coordinates (2,1), (2,2), (2,3), . . . (2,j) on one line below. In the case of the right-opening mode content, coordinates (1,j) of the nth display screen are the origin point, and the content [a, I, u, e . . . ] is displayed in vertical script from top to bottom within the page in the sequence of (1,j), (2,j), (3,j) . . . (k,j). When the display of the first column ends, the content of the second column is displayed in vertical script from top to bottom within the page in the sequence of coordinates (1,j−1), (2,j−1), (3,j−1) . . . (k,j−1) on the next column to the left. When the number of horizontal lines and the number of vertical columns is different, the content recorded on the second line in horizontal script can also be displayed continuously in the first column in vertical script.

Figure 6:
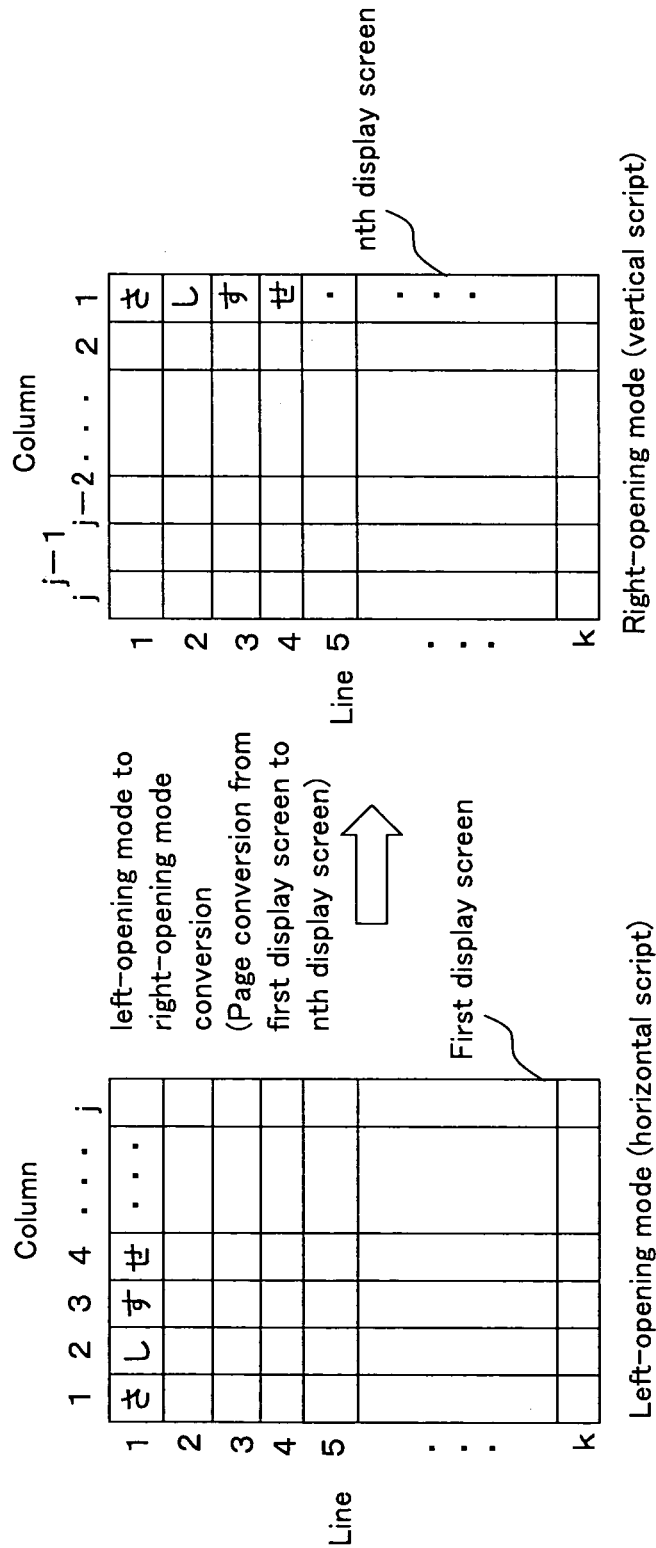
FIG. 6 shows another conversion from the left-opening mode to the right-opening mode (Japanese language)

Although the left corner of the display screen is the same origin point (1,1) in both the left-opening mode and the right-opening mode in FIG. 5, the coordinates for starting the display of the content are different. That is, the content display starts from coordinates (1,1) of the first display screen in the left-opening mode, but the content display starts from coordinates (1,j) of the nth display screen in the right-opening mode. However, the origin point may be changed in the left-opening mode and the right-opening mode, as shown in FIG. 6. FIG. 6 shows another conversion from the left-opening mode to the right-opening mode. As shown in FIG. 6, the left corner of the display screen is the origin point (1,1) in the left-opening mode, and the right corner of the display screen is the origin point (1,1) in the right-opening mode. In the case of the left-opening mode, the content is displayed in horizontal script from left to right within the page in the sequence of coordinates (1,1), (1,2) . . . (1,j−1), (1,j) of the first display screen. However, in the case of the right-opening mode, the content is displayed in vertical script from top to bottom within the page in the sequence of coordinates (1,1), (2,1) . . . (k−1,1), (k,1) of the nth display screen.

Figure 7:
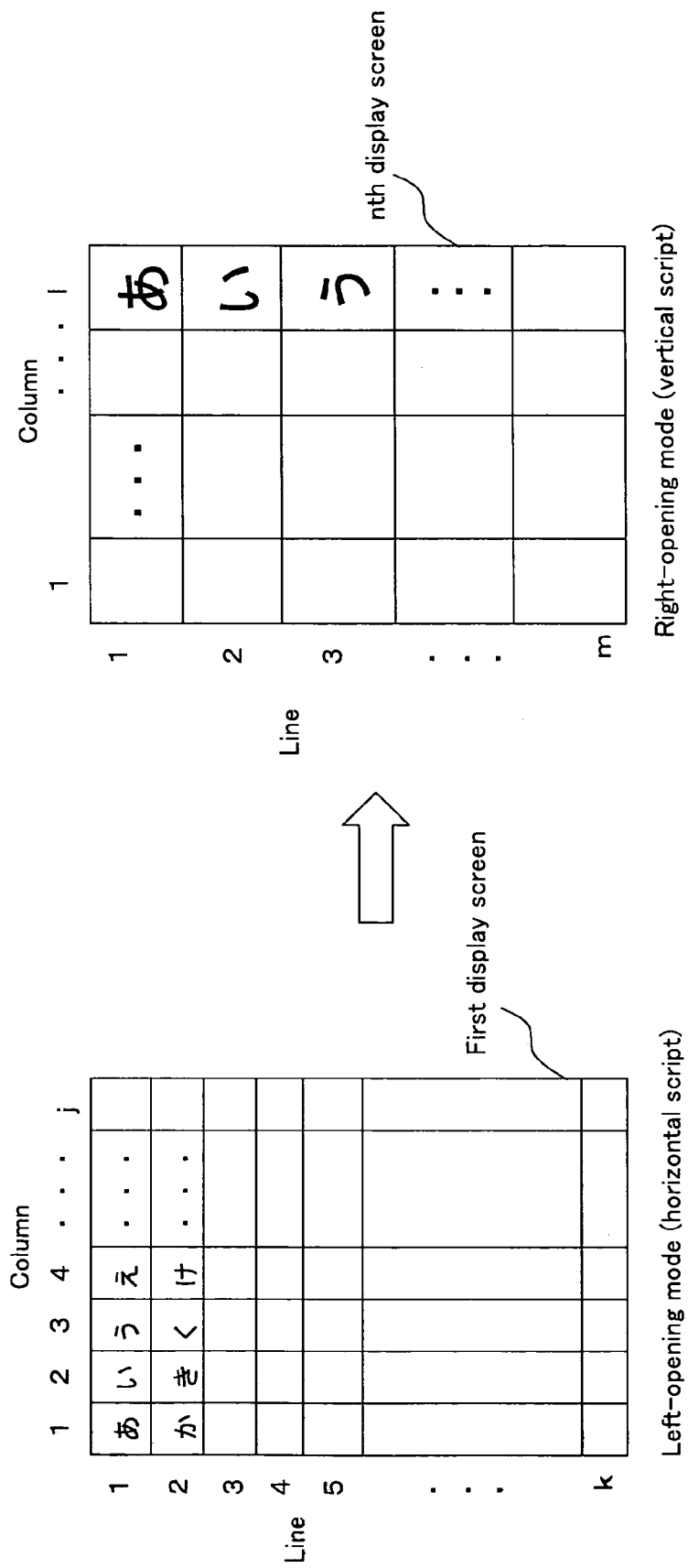
FIG. 7 Illustrates an enlarged display (Japanese language)

An enlarged display is shown in FIG. 7. FIG. 7 illustrates an enlarged display. For example, when converting from the left-opening mode to the right-opening mode, the display control unit 31 is assumed to receive instructions for an enlarged display from the user through the user input receiving unit 21. The display control unit 31 controls the size of one section and sets the coordinates in accordance with the magnification of the enlarged display. In FIG. 7, the display screen configured by (1-k: from 1 to k) lines by (1-j: from 1 to j) columns is revised and set in a matrix of (1-l: from 1 to l) lines by (1-m: from 1 to m) columns so that the size of one section is enlarged. In this case, j>l, and k>m. As shown in FIG. 7, the left-opening mode content displayed in the sequence of coordinates (1,1), (1,2), (1,3) . . . (1,j−1), (1,j) in the first display screen, are enlarged and arranged so as to fill the size of every section defined by the coordinates (1,l), (2,l), (3,l) . . . (m,l) of the nth display screen, making it possible to enlarge the display.

The size of the content can not only be enlarged, it can also be reduced, and can be converted to various other display modes. The origin point setting method and content enlarging method are not limited to the methods described above.

(2) Method for Display Rotation (2-1) Summary

Figure 8A:
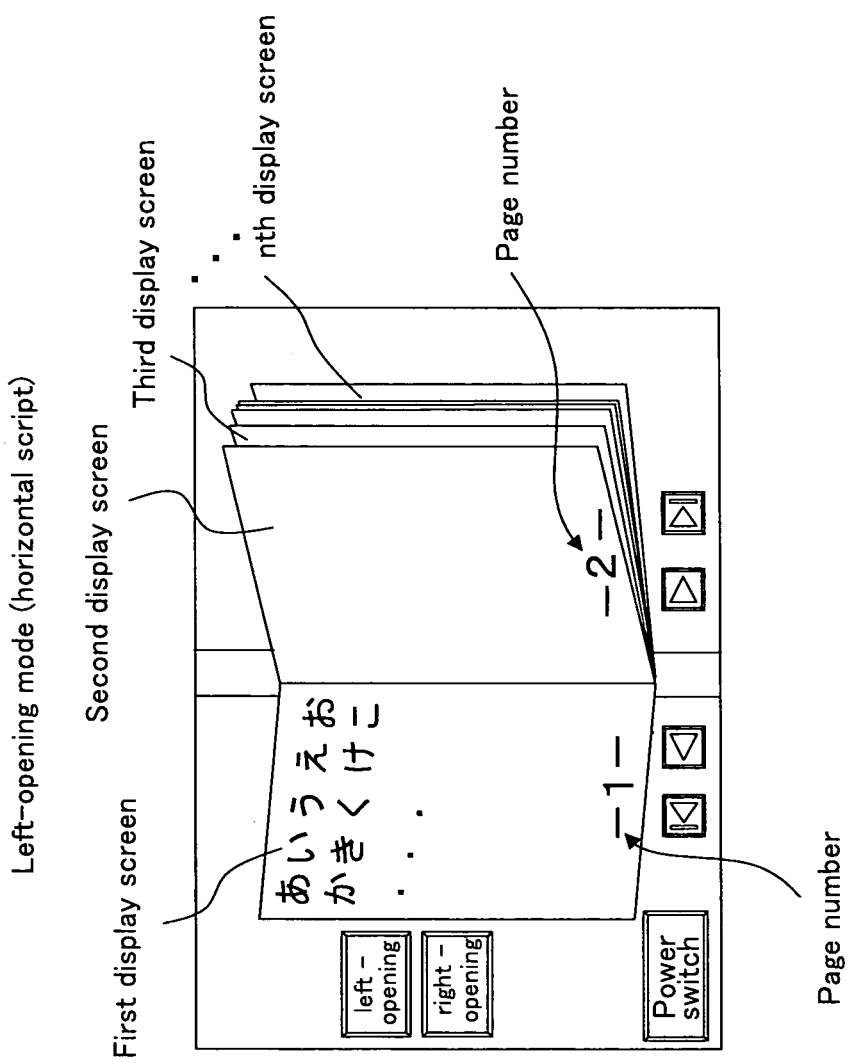
FIG. 8A illustrates a method for switching the left-opening mode and the right-opening mode by a display rotation method, and shows the content of the left-opening mode displayed (Japanese language)
Figure 8B:
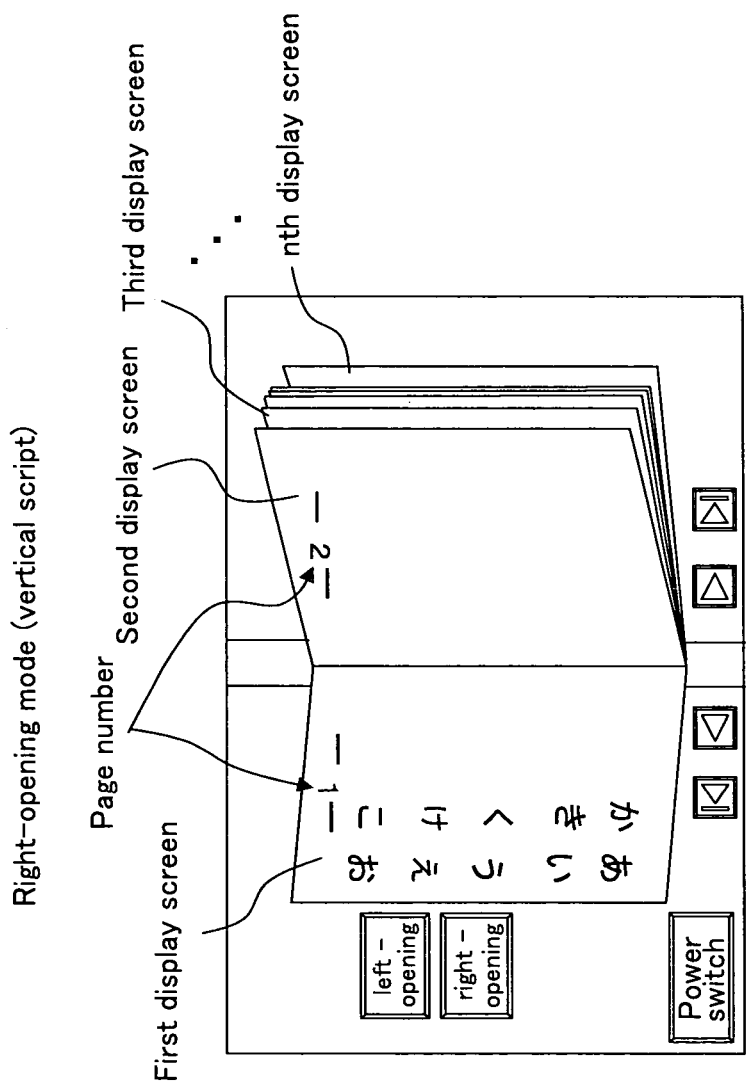
FIG. 8B illustrates a method for switching the left-opening mode and the right-opening mode by a rotation display method, and shows the content of the right-opening mode displayed (Japanese language)

FIGS. 8A and 8B illustrate the method for switching between the left-opening mode and the right-opening mode by a method of display rotation. FIG. 8A shows the display of the left-opening mode content, and FIG. 8B shows the display of the right-opening mode content. According to this method, as shown in FIGS. 8A and 8B, the content display starts in ascending order from the first display screen in both the left-opening mode and the right-opening mode, and the content is arranged such that the top and bottom of the content is reversed between the left-opening mode and the right-opening mode. As in the previous example, the left-opening mode is the standard opening direction, and the numbers of the display screens displayed in the first display screen, second display screen, . . . nth display screen are fixed for both the left-opening mode and the right-opening mode.

As shown in FIG. 8A, in the case of the left-opening mode, the content is arranged in horizontal script from left to right within the page, and the first page, second page, nth page are respectively displayed sequentially in the first display screen, second display screen, . . . nth display screen. In the case of the right-opening mode, content is rotated 180 degrees relative to the left-opening mode, and the content is arranged and displayed in vertical script from the bottom to the top within the page. Furthermore, in the right-opening mode, the first page, second page, . . . nth page are respectively displayed sequentially in the first display screen, second display screen, . . . nth display screen similar to the left-opening mode. The page number layout is reversed top and bottom between the left-opening mode and the right-opening mode.

Thus, content can be displayed so as to correspond to both the left-opening mode and the right-opening mode by rotating the content between the left-opening mode and the right-opening mode. Furthermore, a user can read the content as the left-opening mode or the right-opening mode by rotating the electronic display device itself, or rotating the display screen.

(2-2) Examples

Figure 9:
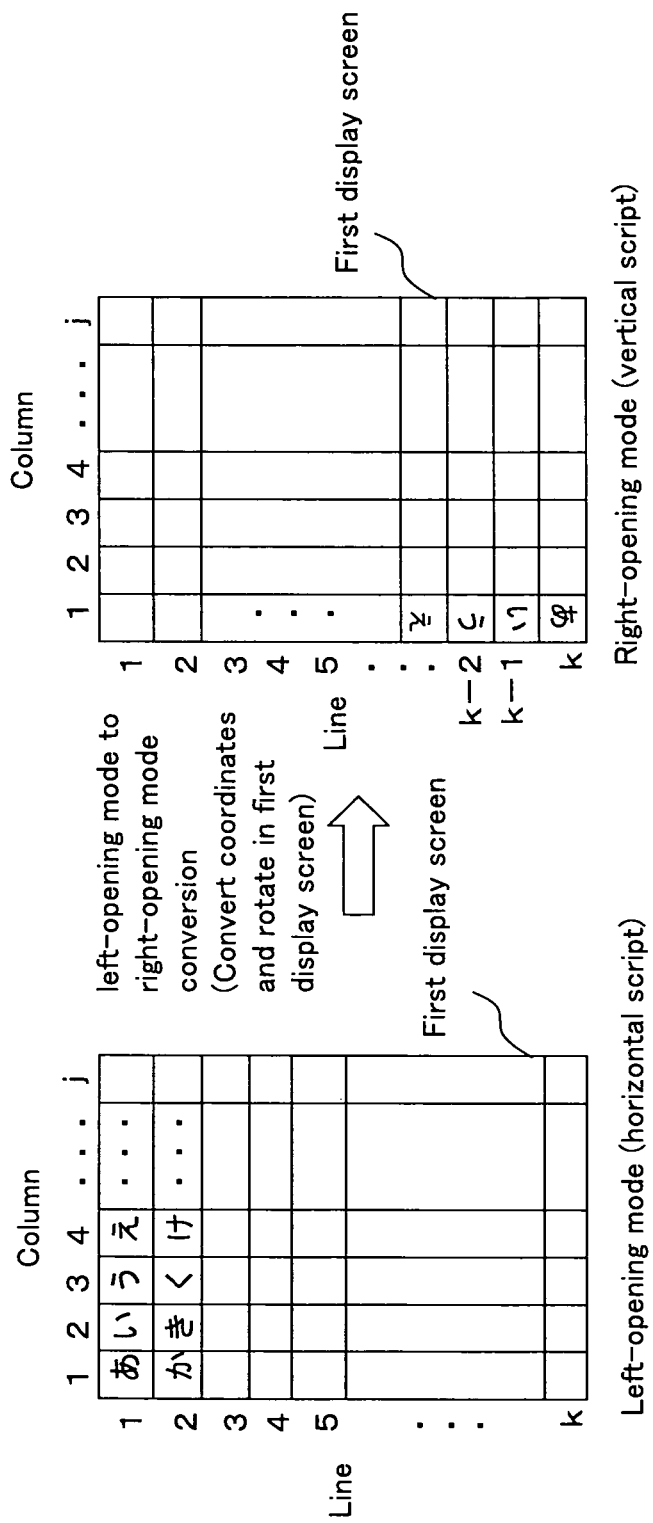
FIG. 9 shows the conversion from the left-opening mode to the right-opening mode by the display rotation method (Japanese language)

Details of the method for display rotation performed by the display control unit 31 are described below using FIG. 9. FIG. 9 illustrates the conversion from the left-opening mode to the right-opening mode by the display rotation method. As shown in FIG. 9, for example, the display screen is configured by a matrix of (1-k: from 1 to k) lines by (1-j: from 1 to j) columns, and one character is recorded in one section. In the case of the left-opening mode, the content [a, i, u, e . . . ] is displayed in horizontal script from left to right within the page in the sequence of coordinates (1,1), (1,2), (1,3), . . . (1,j−1), (1,j) in the first display screen. When the first line display ends, the content [ka, ki, ku, ke . . . ] of the second line is displayed in horizontal script from left to right within the page in the sequence of coordinates (2,1), (2,2), (2,3) . . . (2,j) on the next lower line. In the case of the right-opening mode, however, the content [a, i, u, e . . . ] is rotated 180 degrees and displayed in vertical script from bottom to top within the page in the sequence of coordinates (k,1), k−1,1), (k−2,1), . . . (1,1) in the first display screen. When the display of the first column ends, the content of the second line is rotated 180 degrees and displayed in vertical script from bottom to top within the page in the sequence of coordinates (k,2), (k−1,2), (k−2,2), . . . (1,2) on the next column to the right. When the number of horizontal lines and the number of vertical columns is different, the content recorded on the second line in horizontal script can also be displayed continuously in the first column in vertical script.

Figure 10:
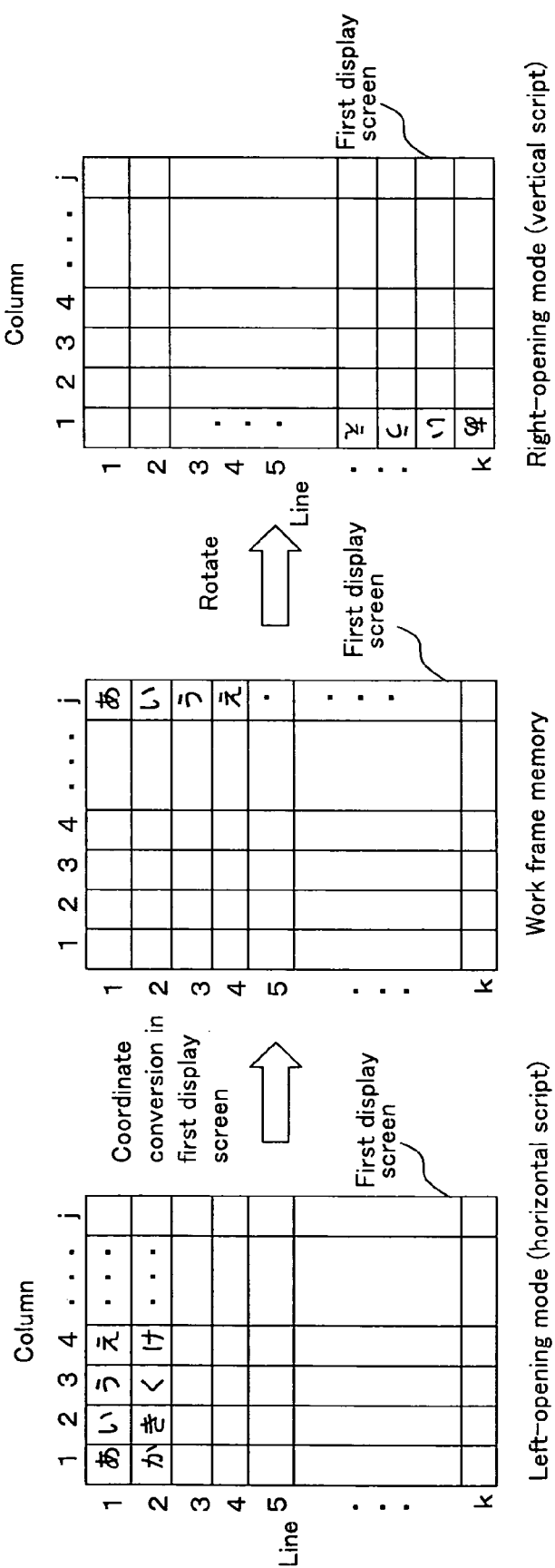
FIG. 10 shows another conversion from the left-opening mode to the right-opening mode by a display rotation method (Japanese language)

FIG. 10 illustrates another conversion from the left-opening mode to the right-opening mode by a display rotation method. In FIG. 10, the content displayed in horizontal script is converted to vertical script and stored in a temporary work frame memory. That is, the content displayed in horizontal script from left to right within the page in the sequence of coordinates (1,1), (1,2), (1,3) . . . (1,j−1), (1,j) in the left-opening mode corresponds to, in the right-opening mode, the vertical script from top to bottom within the page in the sequence of coordinates (1,j), (2,j), (3,j) . . . (k,j) using the work frame memory. Thereafter, the entirety of the content converted in the work frame memory is rotated and displayed in the display screens. Thus, the content can be converted from the left-opening mode to the right-opening mode similar to FIG. 9.

Moreover, the setting of the origin point may be changed similar to the method for switching the display sequence of the display screens, and enlarged display and reduced display may also be performed.

Although a case when the top and bottom of the content is reversed during conversion from the left-opening mode to the right-opening mode is described above, the content also may be, for example, rotated 90 degrees by instructions from the user.

(2-3) Reading Content

Figure 11A:
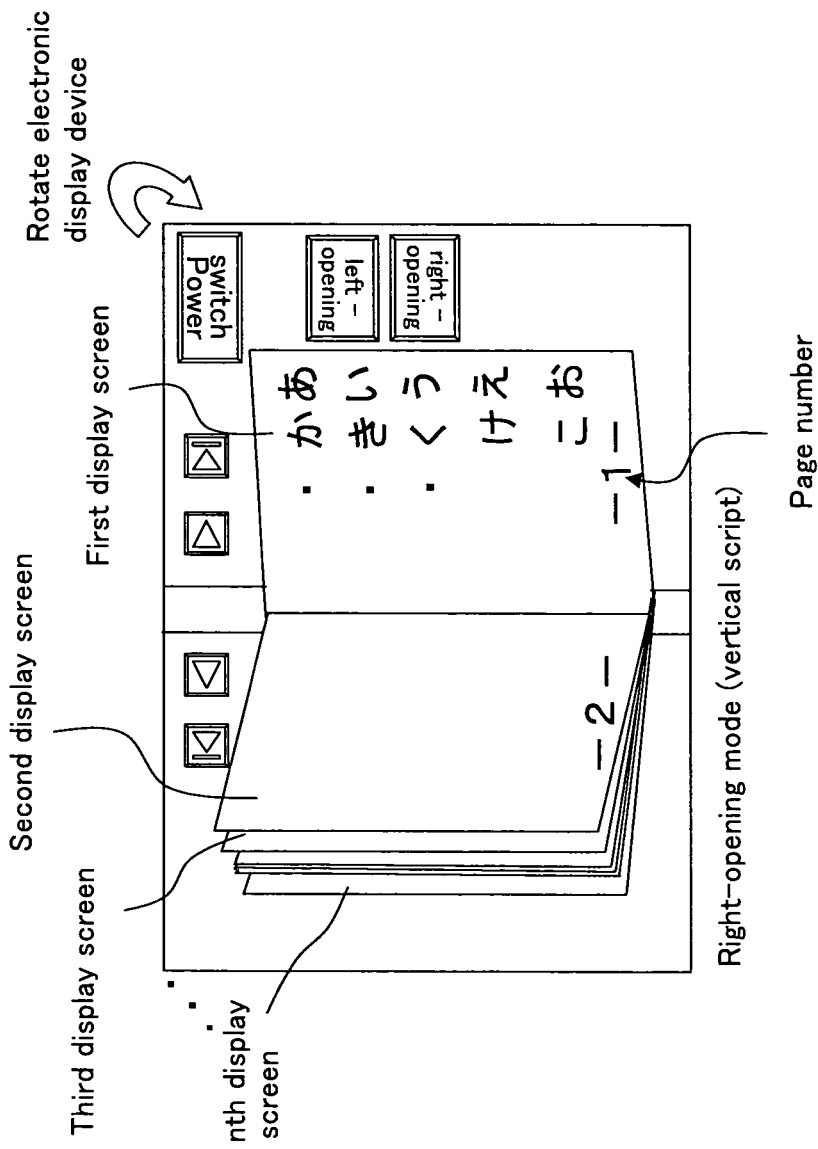
FIG. 11A shows a case in which the electronic display device itself is rotated.
Figure 11B:
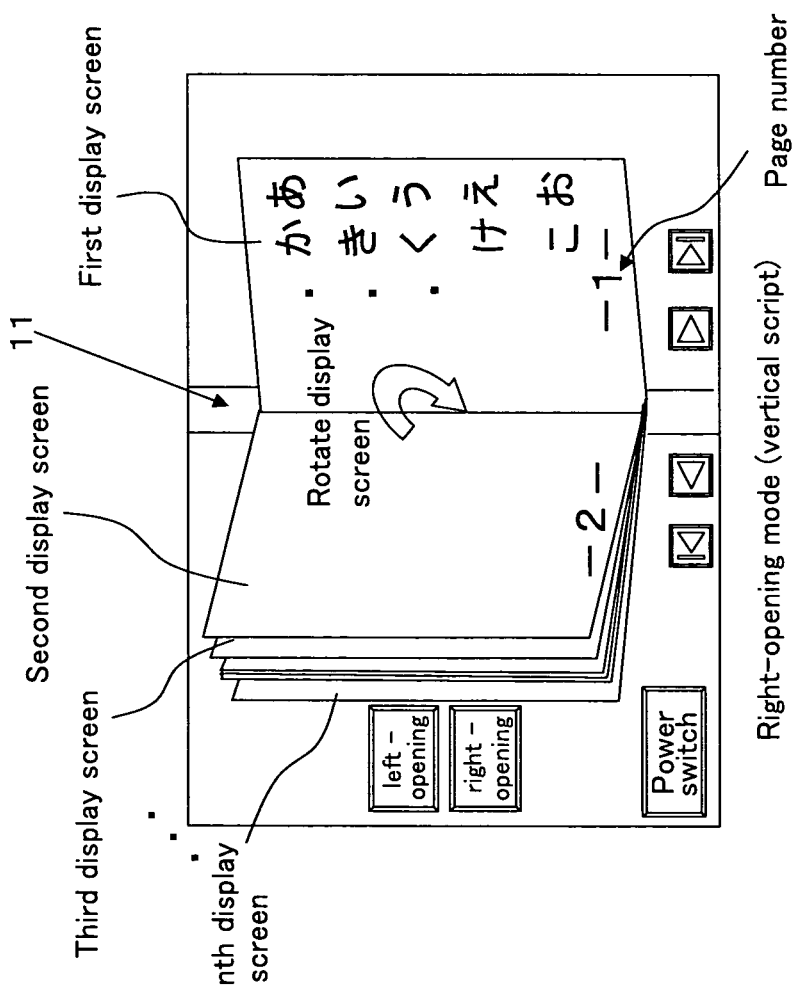
FIG. 11B shows a case in which only the display screen is rotated.

The content converted to the right-opening mode, as shown in FIGS. 8B, 9, and 10, is rotated 180 degrees and inverted top and bottom relative to the left-opening mode content. Thus, the user rotates the electronic display device 10 itself as shown in FIG. 11A, or rotates only the display screen 13 by pivoting on the hinge 11 as shown in FIG. 11B in order to read the content. In this way the user is able to read the content whether in the left-opening mode or the right-opening mode.

(B) English Language

The method for rotating and displaying content, and the method for switching the display sequence of the display screens are both described below by way of examples of English language text in the left-opening mode and the right-opening mode. In the case of English language, both of the left-opening mode content and the right-opening mode content are displayed with letters written in horizontal script from left to right within the page. Since other configurations are similar to the Japanese language examples of FIGS. 4A and 4B, the following description is simplified.

Figure 12A:
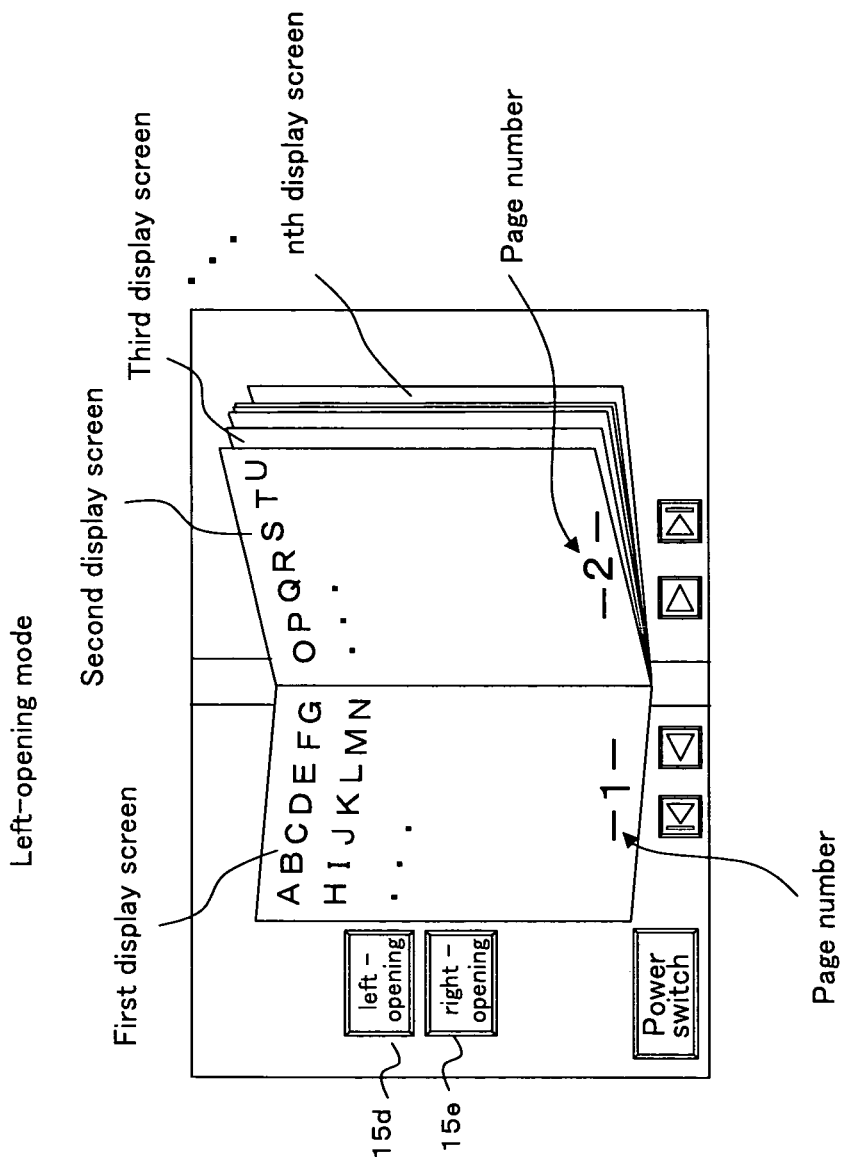
FIG. 12A illustrates a method for switching the left-opening mode and the right-opening mode by a display sequence switching method, and shows the content of the left-opening mode displayed (English language)
Figure 12B:
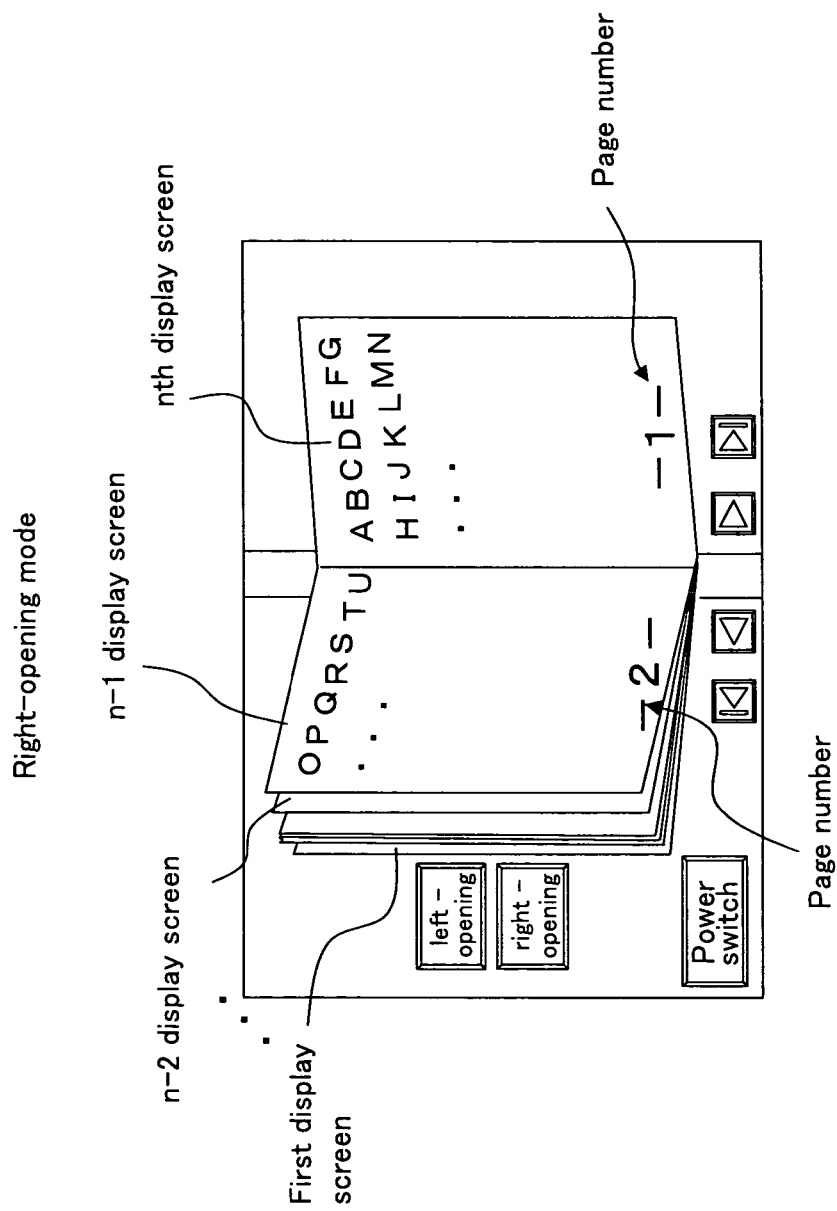
FIG. 12B illustrates a method for switching the left-opening mode and the right-opening mode by a display sequence switching method, and shows the content of the right-opening mode content displayed (English language)

(1) Method for Switching the Display Sequence of the Display Screens (1-1) Summary FIGS. 12A and 12B illustrate the method of switching between the left-opening mode and the right-opening mode by the display sequence switching method. FIG. 12A shows the left-opening mode content being displayed, and FIG. 12B shows the right-opening mode content being displayed.

The content reading unit 27 reads the content from the content storage unit 25. The opening direction recognizing unit 29 recognizes whether the opening direction of the content is the left-opening mode or the right-opening mode from the content attribute information, and outputs the result to the display control unit 31. When the content is the left-opening mode, the display control unit 31 displays the content in horizontal script from left to right within the page with the first page content displayed in the first display screen, second page content displayed in the second display screen, and the nth page content displayed in the in the nth display screen, as shown in FIG. 12A. When the content is the right-opening mode, the display control unit 31 displays the content in horizontal script with the first page content displayed in the nth display screen, second page content displayed in the n−1 display screen, and the nth page content displayed in the in the first display screen, as shown in FIG. 12B. That is, the display control unit 31 arranges and displays the content in ascending order from the first display screen for the left-opening mode content, and arranges and displays the content in descending order from the nth display screen for the right-opening mode content.

(1-2) Examples

Figure 13:
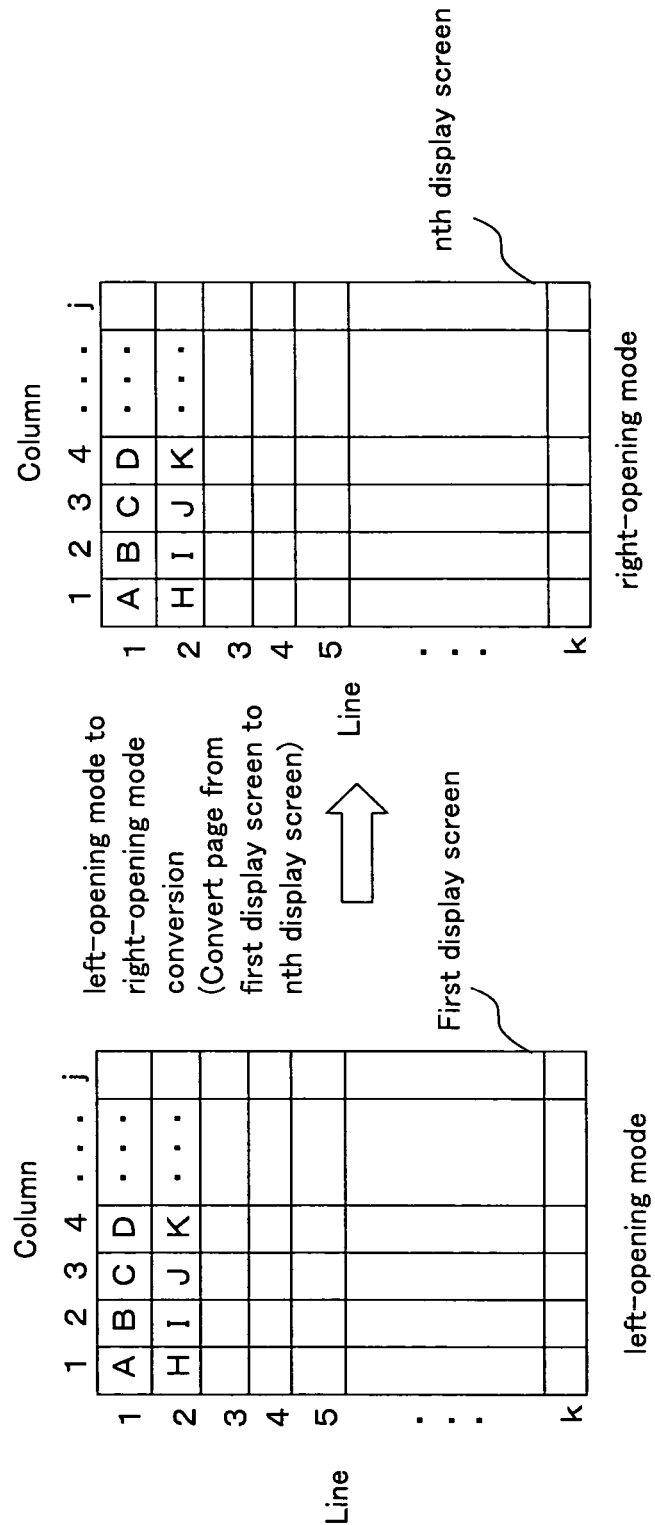
FIG. 13 shows the conversion from the left-opening mode to the right-opening mode by a method for switching the display sequence of the display screens (English language)

The method for switching the display sequence of the display screens used by the display control unit 31 is described by way of examples below using FIG. 13. FIG. 13 illustrates the conversion from the left-opening mode to the right-opening mode by the display screen display sequence switching method. As shown in FIG. 13, the display screen is, for example, configured by a matrix of (1-k: from 1 to k) lines by (1-j: from 1 to j) columns, and one letter is recorded in one section. In the case of the left-opening mode content, the coordinates (1,1) of the first display screen defines the origin point, and content [A, B, C, D . . . ] is displayed in horizontal script from left to right within the page in the sequence (1,1), (1,2), (1,3), . . . (1,j−1), (1,j). When the first line display ends, the content of the second line [H, I, J, K . . . ] is displayed in horizontal script from left to right within the page in the sequence of coordinates (2,1), (2,2), (2,3), . . . (2,j) on one line below. In the case of the right-opening mode content, coordinates (1,1) of the nth display screen define the origin point, and the content [A, B, C, D . . . ] is displayed in horizontal script from left to right within the page in the sequence of (1,1), (1,2), (1,3) . . . (1,j−1), (1,j). When the display of the first line ends, the content [H, I, J, K . . . ] of the second line is displayed in horizontal script from left to right within the page in the sequence of coordinates (2,1), (2,2), (2,3) . . . (2,j) on the next line below.

(2) Display Rotation Method (2-1) Summary

Figure 14A:
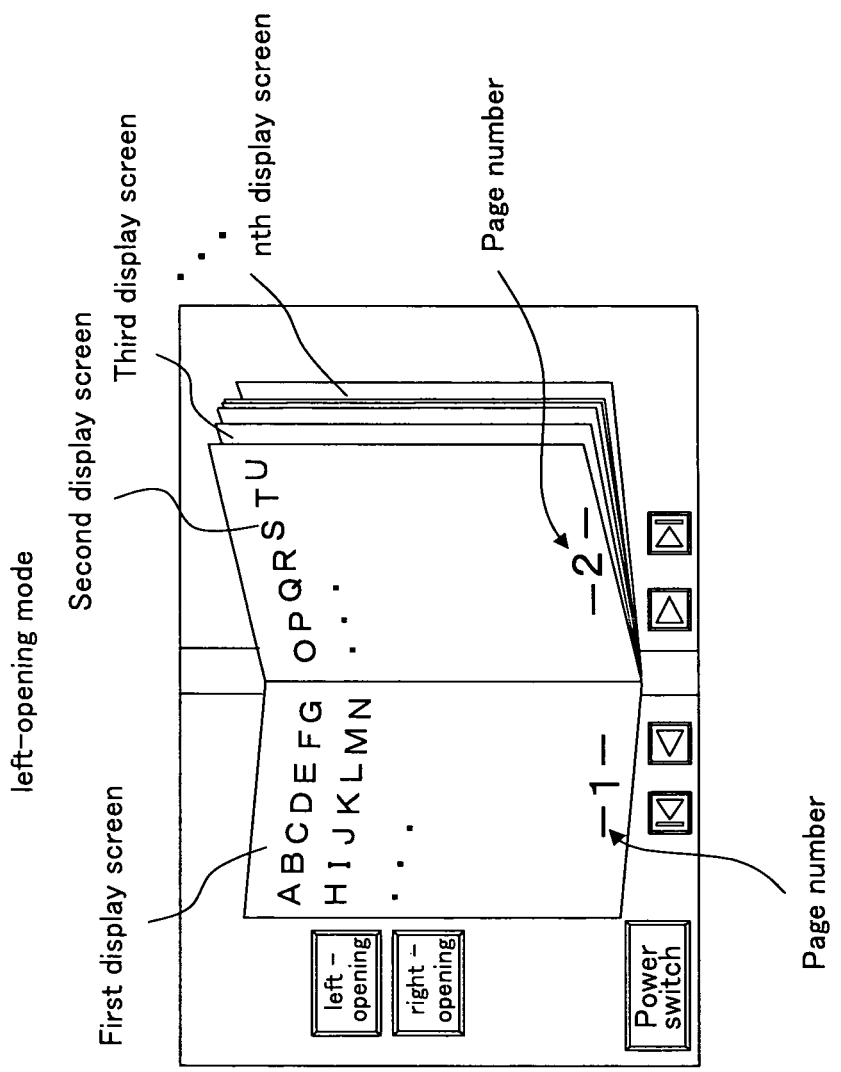
FIG. 14A illustrates a method for switching the left-opening mode and the right-opening mode by a display rotation method, and shows the content of the left-opening mode displayed (English language)
Figure 14B:
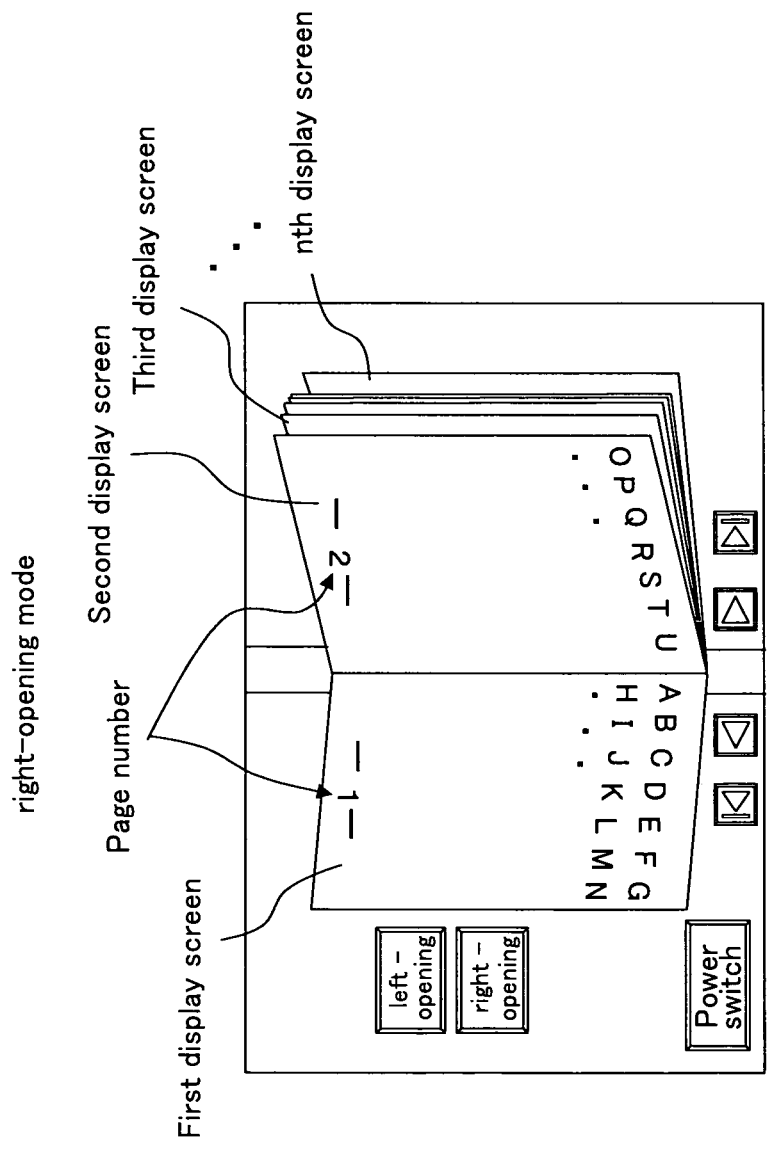
FIG. 14B illustrates a method for switching the left-opening mode and the right-opening mode by a rotation display method, and shows the content of the right-opening mode displayed (English language)

FIGS. 14A and 14B illustrate the method of switching between the left-opening mode and the right-opening mode using the display rotation method. FIG. 14A shows the left-opening mode content being displayed, and FIG. 14B shows the right-opening mode content being displayed.

As shown in FIG. 14A, in the case of the left-opening mode content, the content is arranged in horizontal script from left to right within the page, and the first page, second page, . . . nth page are sequentially displayed in the first display screen, second display screen, . . . nth display screen. In the case of the right-opening mode content, the content is arranged in horizontal script within the page, and the first page, second page, . . . nth page are sequentially displayed in the first display screen, second display screen, . . . nth display screen, however, the content is rotated 180 degrees relative to the left-opening mode content.

(2-2) Examples

Figure 15:
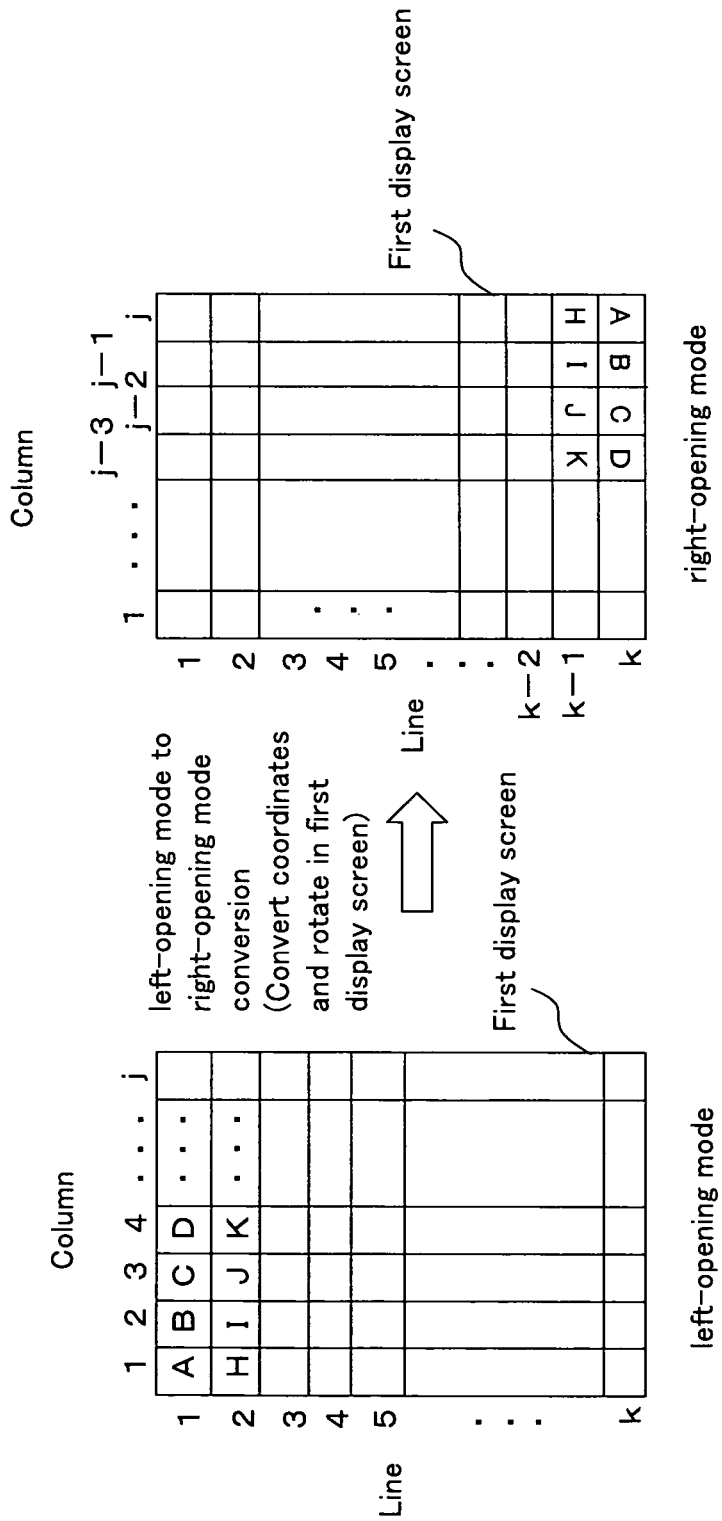
FIG. 15 shows the conversion from the left-opening mode to the right-opening mode by a display rotation method (English language)

The method for rotating the display used by the display control unit 31 is described by way of examples below using FIG. 15. FIG. 15 illustrates the conversion from the left-opening mode to the right-opening mode by the display rotation method. In the case of the left-opening mode content, the content [A, B, C, D . . . ] is displayed in horizontal script sequentially at coordinates (1,1), (1,2), (1,3), . . . (1,j−1), (1,j) in the first display screen. When the first line display ends, the content of the second line [H, I, J, K . . . ] is displayed in horizontal script sequentially at coordinates (2,1), (2,2), (2,3), . . . (2,j) on the next line below. In the case of the right-opening mode content, the content [A, B, C, D . . . ] is rotated 180 degrees and displayed in horizontal script sequentially at coordinates (k,j), (K,j−1), (K,j−2), . . . (k,1) in the first display screen. When the display of the first line ends, the content [H, I, J, K . . . ] is rotated 180 degrees and displayed sequentially at coordinates (k−1,j), (k−1,j−1), (k−1,j−2), . . . (k−1,1) on the next line below.

(C) Manga

An example describing manga content is described below. The example particularly describes the case of manga in which the dialog is recorded in the English language, and the display screen display sequence switching method and content display rotation method are used.

(1) Method for Switching the Display Sequence of the Display Screens

Figure 16A:
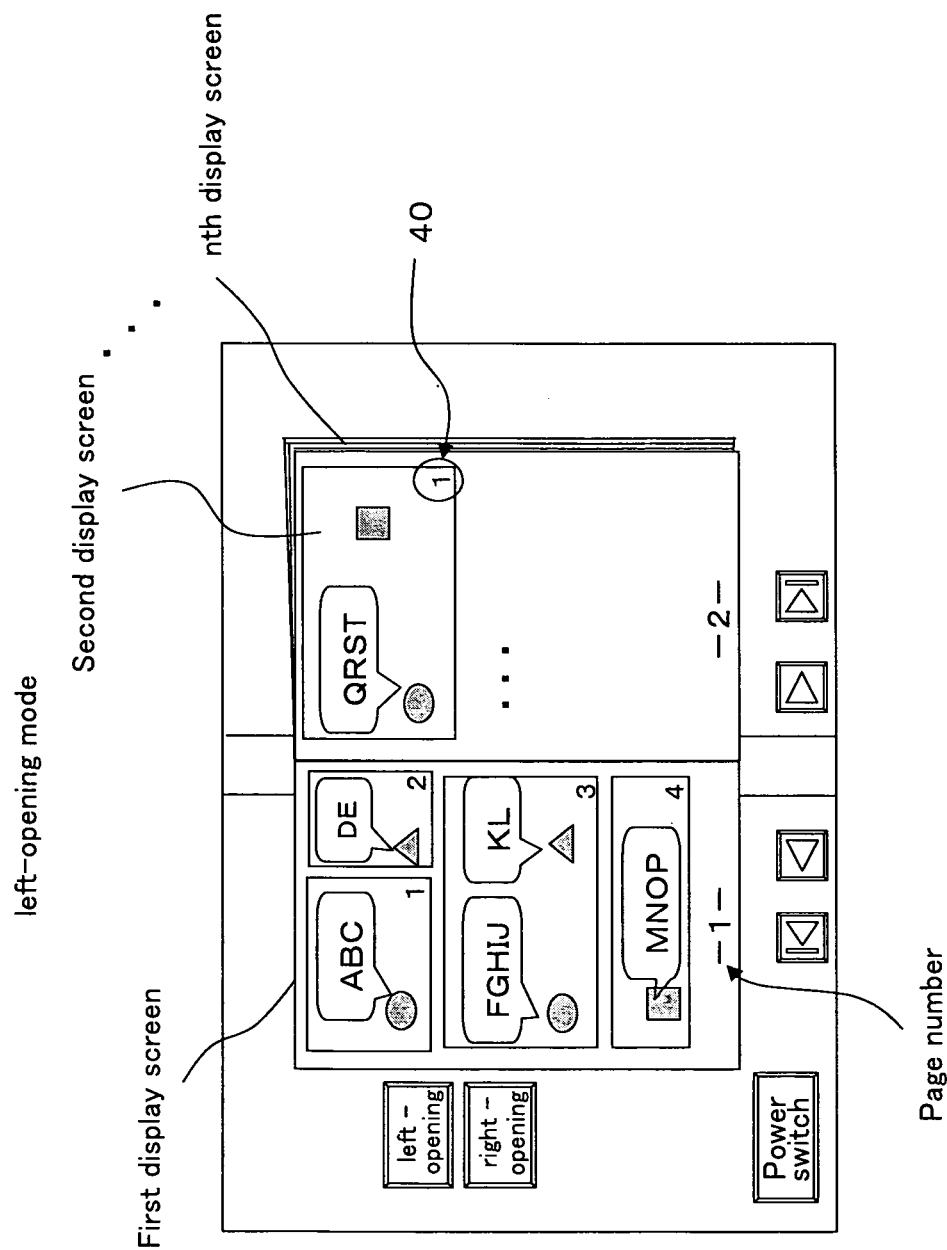
FIG. 16A illustrates a method for switching the left-opening mode and the right-opening mode by a display sequence switching method, and shows the content of the left-opening mode displayed (English language manga)
Figure 16B:
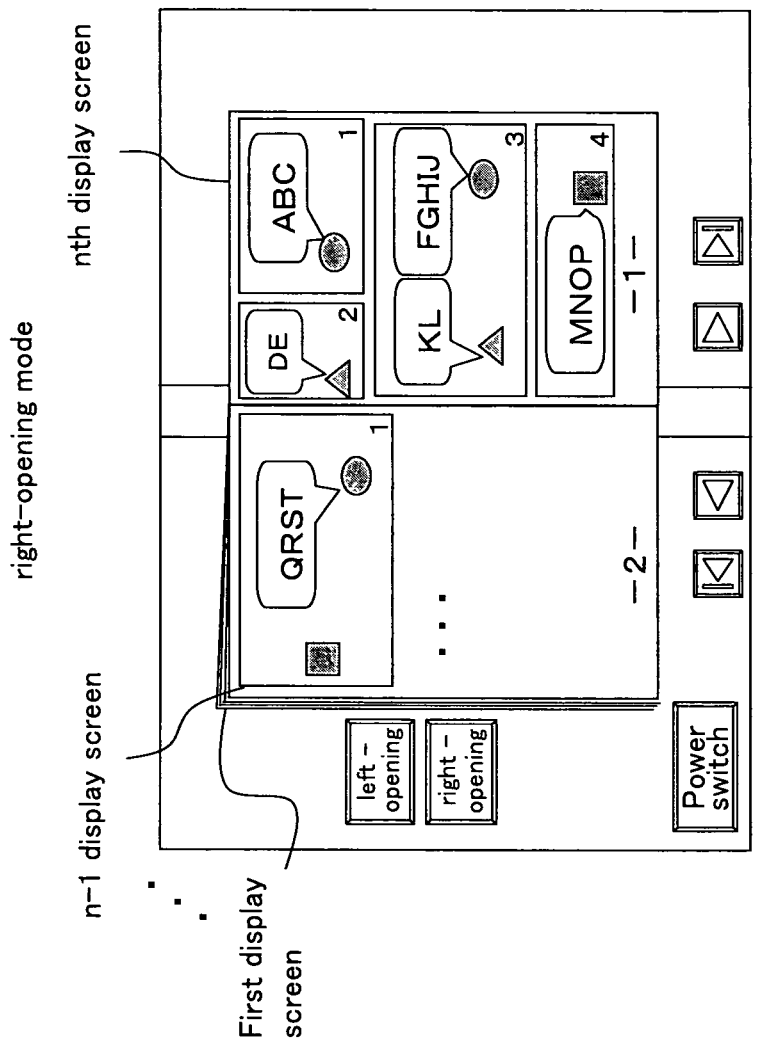
FIG. 16B illustrates a method for switching the left-opening mode and the right-opening mode by a display sequence switching method, and shows the right-opening mode content displayed (English language manga)

FIGS. 16A and 16B illustrate the method of switching between the left-opening mode and the right-opening mode by the display sequence switching method. FIG. 16A shows the left-opening mode content being displayed, and FIG. 16B shows the right-opening mode content being displayed. The content in FIGS. 16A and 16B is a manga type, in which the story sequence is indicated by a subscript 40 in a circumscribed block in each page. In each block, characters are indicated by circles and squares and the like, and the conversation of the characters is displayed in text balloons. In the case of the left-opening mode content shown in FIG. 16A, each block is arranged from left to right, and since the text of the conversation is in the English language, the text is arranged from left to right; and the characters in each block are arranged in the story sequence from left to right. Thus, the conversation sequence of the first page in FIG. 16A is [ABC] →[DE]→[FGHI]→[MNOP].

It is assumed that the user can specify, for example, conversion from the left-opening mode content of FIG. 16A to the right-opening mode content of FIG. 16B. The display control unit 31 arranges the content as shown in FIG. 16B. In FIG. 16B, the blocks are arranged from right to left, the text is arranged from left to right since the text of the conversation is in the English language, and the characters in each block are arranged from right to left. That is, although the arrangement direction of the blocks is reverse and the image data, such as the characters of each block, are reversed left and right between the left-opening mode and the right-opening mode, the text of the conversation remains arranged from left to right.

The display control unit 31 associates and stores information such as that shown in FIG. 17 beforehand to accomplish the arrangement above. When converted from the left-opening mode to the right-opening mode, the display control unit 31 arranges the content so that the nth display screen and n−1 display screen become the first page and second page based on the information of FIG. 17. Within the page, the blocks are arranged from right to left and from top to bottom, and the images of the characters and the like in each block are arranged from right to left. The conversation of the characters is arranged from left to right since the text is in the English language.

Alternatively, the information shown in FIG. 17 may be included in the content as attribute information, and the display control unit arranges and displays the manga as shown in FIGS. 16A and 16B by basing the arrangement on the attribute information.

(2) Display Rotation Method

Figure 18A:
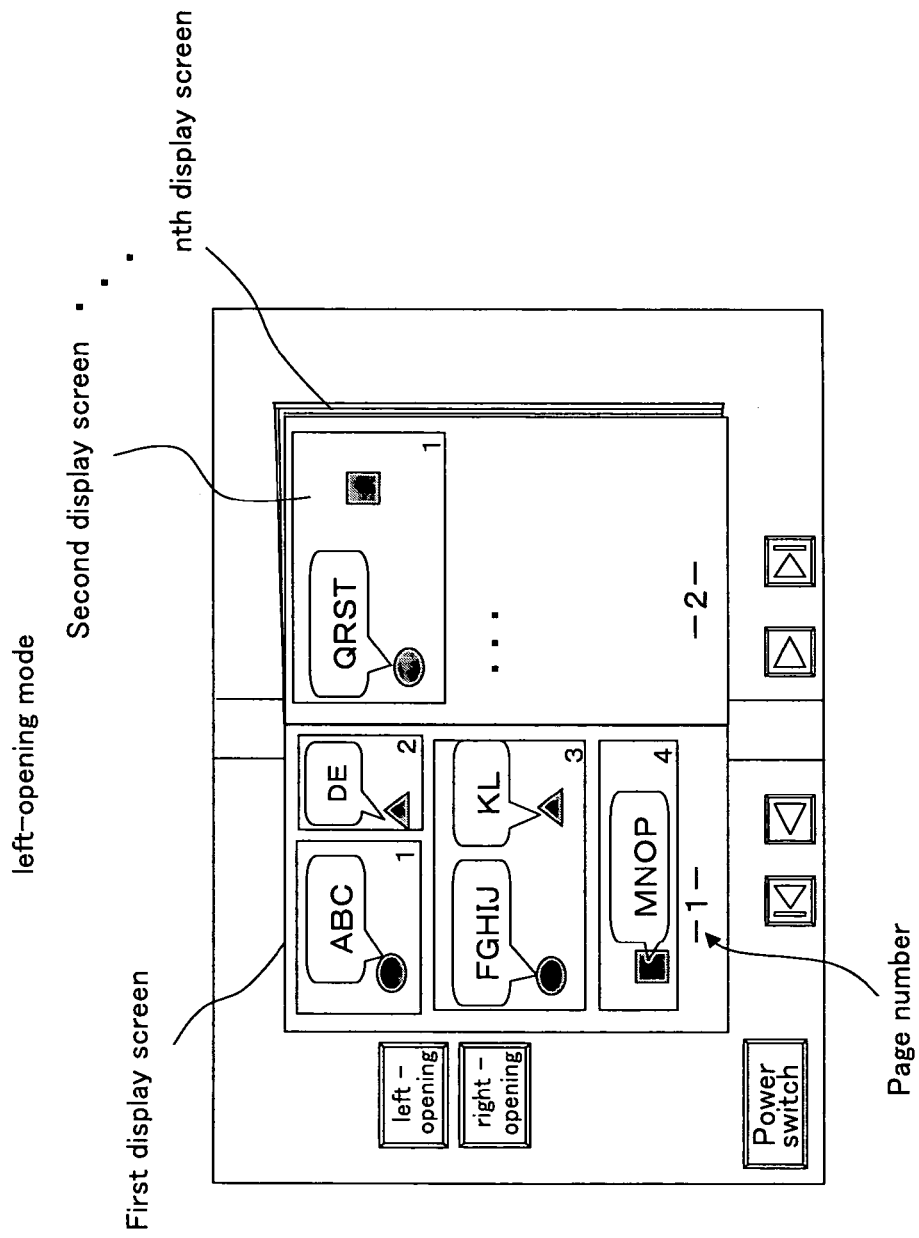
FIG. 18A illustrates a method for switching the left-opening mode and the right-opening mode by a display rotation method, and shows the content of the left-opening mode displayed (English language manga)
Figure 18B:
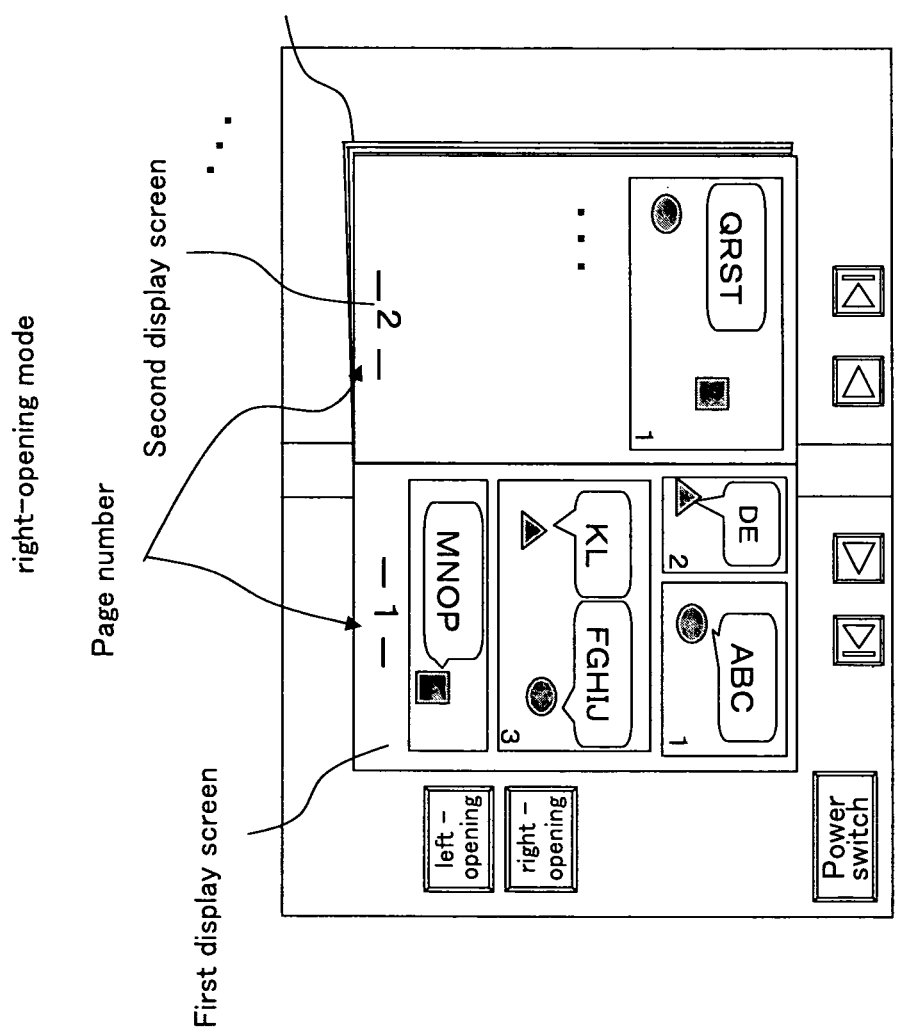
FIG. 18B illustrates a method for switching the left-opening mode and the right-opening mode by a display rotation method, and shows the content of the right-opening mode displayed (English language manga)

FIGS. 18A and 18B illustrate the method of switching from the left-opening mode to the right-opening mode using the display rotation method. FIG. 18A shows the left-opening mode content being displayed, and FIG. 18B shows the right-opening mode content being displayed. According to this method, the content display starts ascending from the first display screen for both the left-opening mode and the right-opening mode, as shown in FIGS. 18A and 18B. After being converted from the left-opening mode to the right-opening mode, the first page of FIG. 18B is identical to the entirety of the first page that has been rotated 180 degrees for the right-opening mode as shown in FIG. 16B. Various methods may be considered for converting to the right-opening mode by display rotation as shown in FIG. 18B, for example, the display control unit 31 may arrange the content of the first page to correspond to the right-opening mode of FIG. 16B. Thereafter, the display control unit 31 may rotate the first page 180 degrees corresponding to the right-opening mode, and paste the content in the first display screen, as shown in FIG. 17B.

(Effects)

The electronic display device switches the display screen for the starting display of the content, and rotates the display of the content in accordance with the left-opening mode and the right-opening mode as described above. Thus, in an electronic display device having a plurality of display screens in which the pages are turned and read like a book, it is possible to display content in accordance with both the left-opening mode and the right-opening mode.

Other Embodiments (1) Modification 1

Figure 19:
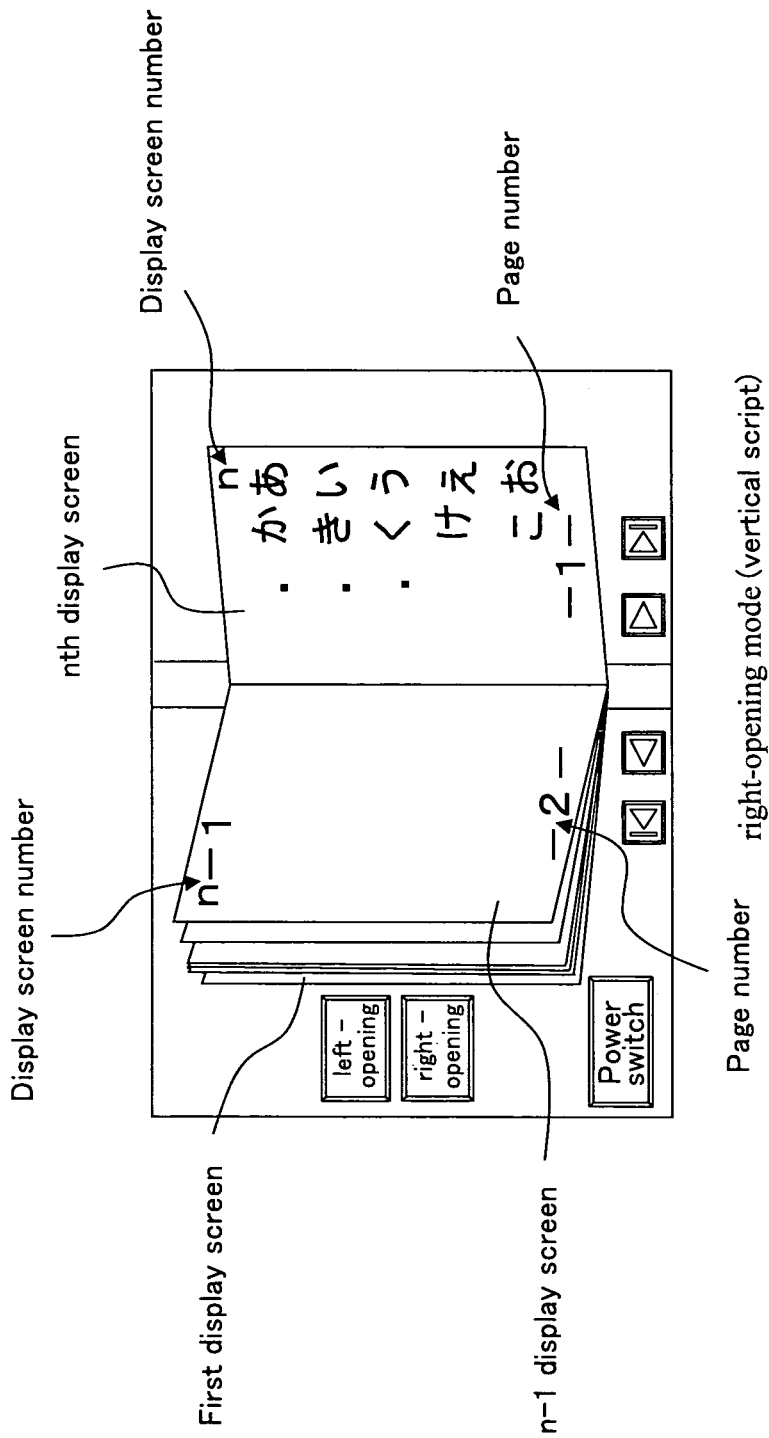
FIG. 19 is a plan view of an electronic display device displaying the number of the display screen in addition to the page number.

FIG. 19 is a plan view of en electronic display device that displays the number of the display screen in addition to the page number. As shown in FIG. 19, the number of the display screen of the electronic display medium is displayed separated from the page number of the content, so that the user can clearly comprehend which display screen is being viewed.

(2) Modification 2

Figure 20:
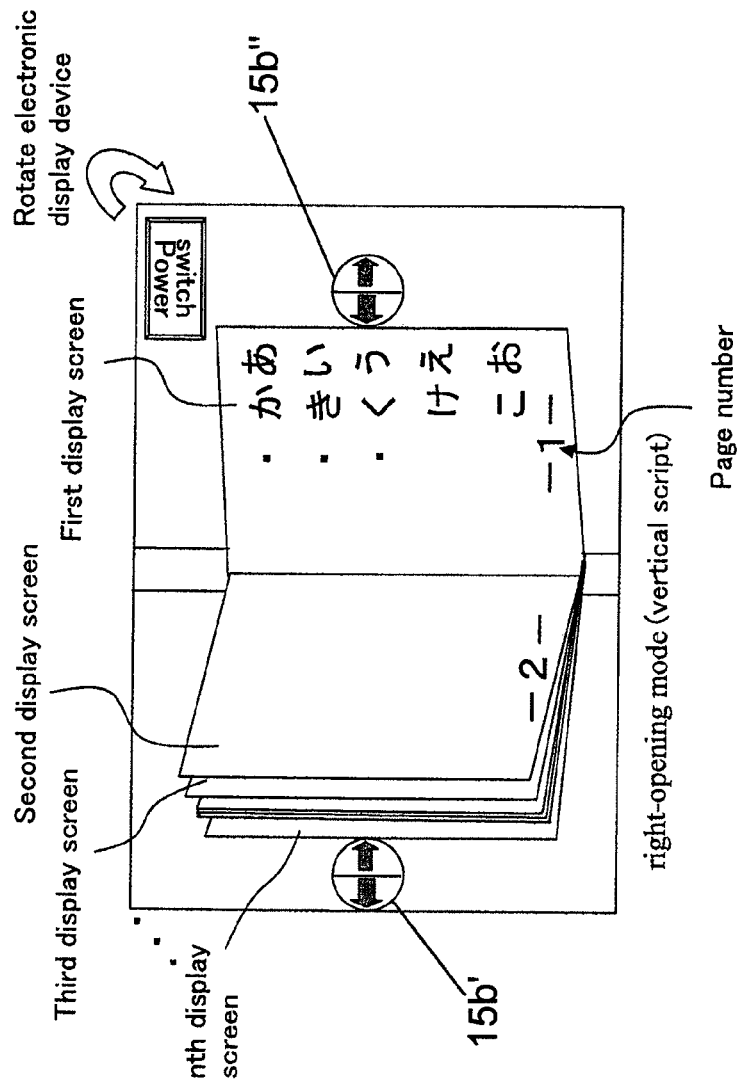
FIG. 20 illustrates the page turning switching mode.
Figure 21:
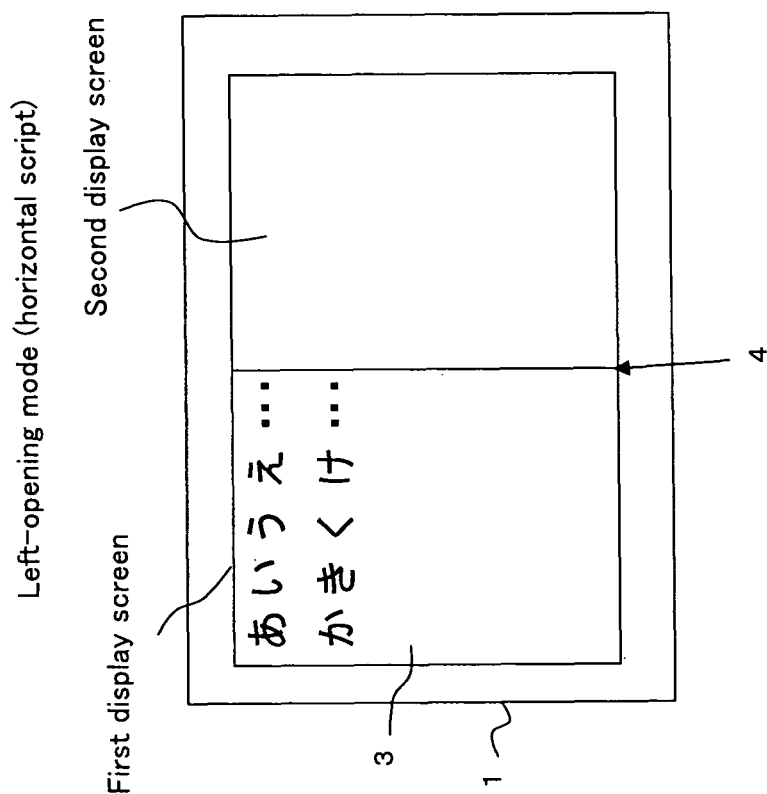
FIG. 21 is a plan view showing the electronic display device disclosed in Japanese Laid-Open Patent No. 2003-196012.

A rewind switch and fast-forward switch 15b are provided on the bottom part of the electronic display device, as shown in FIG. 1 and the like. Thus, when the electronic display device is rotated, as shown in FIGS. 8B and 11A, the rewind switch and fast-forward switch 15b are positioned at the top relative to the user. In FIG. 20, a rewind switches and fast-forward switches 15b' and 15b" are provided on the left and right sides of the electronic display device. Two arrow keys for rewind and fast-forward are respectively provided on the right and left switches 15b' and 15b". The page can be turned back or fast forwarded when a user presses any one of the keys. Therefore, the position of the switches 15b' and 15b" do not change even when the electronic display device itself is rotated if the page turning switches 15b' and 15b" are provided on both sides of the device.

(3) Modification 3

The opening direction of the content is recognized based on the attribute information included in the content in the above examples. However, the opening direction recognizing unit 29 may also recognize the content opening direction based on a style sheet linked to the content.

For example, the content storage unit 25 may store a structured document of the content, and the corresponding style sheet. The structured document may be, for example, a document is a structured language, such as HTML, XML and the like. Furthermore, the style sheet may be a document specifying the appearance of the document, and may record information indicating whether the document is the left-opening mode or the right-opening mode. In addition to the opening direction, the style sheet may also record font type, size of characters, color, line spacing, decoration and the like.

The content reading unit 27 outputs the structured document read from the content storage unit 25 to the display control unit 31, and outputs the style sheet to the opening direction recognizing unit 29. The opening direction recognizing unit 29 recognizes the content as having the left-opening mode or the right-opening mode based on the style sheet received from the content reading unit 27. Then, the opening direction recognizing unit 29 outputs the opening direction of the content to be displayed to the display control unit 31. The display control unit 31 arranges and displays the content on the display screen in accordance with the content opening direction.

(4) Modification 4

The programs for executing, in a computer, the electronic display method in the above electronic display devices, and the computer readable recording medium for recording such programs are included in the scope of the present invention.

The computer readable recording medium may be, for example, a flexible disk, hard disk, CD-ROM, MO, DVD, DVD-ROM, DVD-RAM, BD (Blue-Ray disc), and semiconductor memory.

The computer program is not limited to programs recorded on the recording medium inasmuch as such programs may be transmitted over electric communication line, wireless or wired communication line, or a network such as the Internet.

(5) Modification 5

The recording medium, which records the content including attributes indicating the content opening direction, is included in the scope of the present invention. Similarly, the recording medium recording the style sheet and structured document recording the content is also included in the present invention. The content can be displayed according to the content attributes in the electronic display device when the electronic display device reads the content recorded on the recording medium.

(6) Modification 6

Although the above description has mainly pertained to conversion from the left-opening mode to the right-opening mode, conversion may similarly be made from the right-opening mode to the left-opening mode.

The electronic display device of the present invention is useful for displaying both the right-opening mode content and the left-opening mode content in the same structure.

What is claimed is:

1. An electronic display device comprising:
   a processor;
   a plurality of display screens arranged as a book and configured to open in a two-page spread;
   a memory unit for storing content to be displayed on the plurality of display screens;
   a reading unit in communication with the processor for reading the content from the memory unit;
   an opening-direction recognizing unit in communication with the processor for recognizing a first opening direction of the content on the plurality of display screens and a second opening direction of the content on the plurality of display screens,
   wherein the first opening direction of the content (i) indicates that a direction for turning the plurality of display screens is from right to left and (ii) is for horizontally reading the content from each of the display screens, starting from a left side and continuing across to a right side, and the second opening direction of the content (i) indicates that the direction for turning the plurality of display screens is from left to right and (ii) is for (a) vertically reading the content from each of the display screens, starting from an uppermost portion of the right side and continuing down to a bottommost portion of the right side or (b) horizontally reading the content from each of the display screens, starting from the right side and continuing across to the left side; and
   a display control unit in communication with the processor for arranging in and displaying the content based on the first opening direction of the content and the second opening direction of the content,
   wherein the plurality of display screens includes a first display screen to an $n^{th}$ display screen,
   wherein the display control unit arranges and displays the content in an ascending order of the plurality of display screens starting at the first display screen and continuing to the $n^{th}$ display screen, wherein the content is arranged and displayed in the ascending order of the plurality of display screens starting at the first display screen for both the first opening direction of the content and the second opening direction of the content,
   wherein the display control unit respectively reverses a top and a bottom of the displayed content in the first opening direction of the content from a top and a bottom of the displayed content in the second opening direction of the content, wherein, when the content is displayed in the first opening direction of the content to be read starting from the left side and continuing, across to the right side, the top and the bottom of the displayed content is reverse from the top and the bottom of the displayed content when the content is displayed in the second opening direction of the content to be read starting from the right side and continuing across to the left side or to be read starting from the uppermost portion of the right side and continuing down to the bottommost portion of the right side,
   wherein the content includes attribute information indicating an opening direction and a genre of the content, and
   wherein the opening-direction recognizing unit determines the opening direction of the content based on the opening direction and the genre indicated by the attribute information included in the content.

2. The electronic display device of claim 1, wherein the display control unit (i) arranges and displays the content in the ascending order starting at the first display screen when the content is displayed in the first opening direction of the content, and (ii) arranges and displays the content in a descending order starting at the nth display screen when the content is displayed in the second opening direction of the content.

3. The electronic display device of claim 1, wherein the opening-direction recognizing unit receives, from a user, opening direction information indicating the opening direction of the content.

4. A non-transitory recording medium having an electronic display program recorded thereon and
   content stored thereon, the content being readable by an electronic display device;
   the electronic display program is executed by the electronic display device, causes the electronic display device to:
   display a plurality of display screens arranged as a book and configured to open in a two-page spread, the plurality of display screens including a first display screen to an $n^{th}$ display screen; and causes the electronic display device to function as:
   a memory unit for storing the content read from the non-transitory recording medium, the content to be displayed on the plurality of display screens;
   a reading unit for reading the content from the memory unit;
   an opening-direction recognizing unit for recognizing a first opening direction of the content on the plurality of display screens and a second opening direction of the content on the plurality of display screens,
   wherein the first opening direction of the content (i) indicates that a direction for turning the plurality of display screens is from right to left and (ii) is for horizontally reading the content from each of the display screens, starting from a left side and continuing across to a fight side, and the second opening direction of the content (i) indicates that the direction for turning the plurality of display screens is from left to right and (ii) is for (a) vertically reading the content from each of the display screens, starting from an uppermost portion of the fight side and continuing down to a bottommost portion of the right side or (b) horizontally reading the content from each of the display screens, starting from the right side and continuing across to the left side; and a display control unit arranging and displaying the content based on the first opening direction of the content and the second opening direction of the content, wherein the display control unit arranges and displays the content in an ascending order of the plurality of display screens starting at the first display screen and continuing to the $n^{th}$ display screen, wherein the content is arranged and displayed in the ascending order of the plurality of display screens starting at the first display screen for both the first opening direction of the content and the second opening direction of the content, wherein the display control unit respectively reverses a top and a bottom of the displayed content in the first opening direction of the content from a top and a bottom of the displayed content in the second opening direction of the content, wherein, when the content is displayed in the first opening direction of the content to be read starting from the left side and continuing across to the right side, the top and the bottom of the displayed content is reverse from the top and the bottom of the displayed content when the content is displayed in the second opening direction of the content to be read starting from the right side and continuing across to the left side or to be read starting from the uppermost portion of the right side and continuing down to the bottommost portion of the right side, wherein the attribute information indicates an opening direction and a genre of the content, and wherein the opening-direction recognizing unit determines the opening direction of the content based on the opening direction and the genre indicated by the attribute information included on the non-transitory recording medium.

5. An electronic display method of utilizing an electronic display device,
wherein the electronic display device includes a plurality of display screens arranged as a book and configured to open in a two-page spread, the plurality of display screens including a first display screen to an nth display screen, wherein the electronic display method comprises:
storing content to be displayed on the plurality of display screens;
reading the content stored by the storing of the content;
recognizing one of a first opening direction of the content on the plurality of display screens and a second opening direction of the content on the plurality of display screens, wherein
the first opening direction of the content (i) indicates that a direction for turning the plurality of display screens is from right to left and (ii) is for horizontally reading the content from each of the display screens, starting from a left side and continuing across to a right side,
the second opening direction of the content (i) indicates that the direction for turning the plurality of display screens is from left to right and (ii) is for (a) vertically reading the content from each of the display screens, starting from an uppermost portion of the right side and continuing down to a bottommost portion of the right side or (b) horizontally reading the content from each of the display screens, starting from the right side and continuing across to the left side; and arranging and displaying the content based on the one of the first opening direction of the content and the second opening direction of the content recognized by the recognizing of the one of the first opening direction of the content and the second opening direction of the content, wherein the arranging and displaying of the content includes arranging and displaying the content in an ascending order of the plurality of display screens starting at the first display screen and continuing to the nth display screen, wherein the content is arranged and displayed in the ascending order of the plurality of display screens starting at the first display screen for both the first opening direction of the content and the second opening direction of the content, wherein the arranging and displaying of the content includes respectively reversing a top and a bottom of the displayed content in the first opening direction of the content from a top and a bottom of the displayed content in the second opening direction of the content, wherein, when the content is displayed in the first opening direction of the content to be read starting from the left side and continuing across to the right side, the top and the bottom of the displayed content is reverse from the top and the bottom of the displayed content when the content is displayed in the second opening direction of the content to be read starting from the right side and continuing across to the left side or to be read starting from the uppermost portion of the right side and continuing down to the bottommost portion of the right side, wherein the content includes attribute information indicating an opening direction and a genre of the content, and wherein the recognizing of the one of the first opening direction of the content and the second opening direction of the content determines the opening direction of the content based on the opening direction and the genre indicated by the attribute information included in the content.

6. A non-transitory computer-readable recording medium having an electronic display program recorded thereon,
wherein the electronic display program is executed by an electronic display device, causes the electronic display device to:
display a plurality of display screens arranged as a book and configured to open in a two-page spread,
wherein the plurality of display screens includes a first display screen to an $n^{th}$ display screen,
wherein the electronic display program causes the electronic display device to function as:
a memory unit storing content to be displayed on the plurality of display screens;
a reading unit reading the content from the memory unit;
an opening-direction recognizing unit recognizing a first opening direction of the content on the plurality of display screens and a second opening direction of the content on the plurality of display screens,
wherein the first opening direction of the content (i) indicates that a direction for turning the plurality of display screens is from fight to left and (ii) is for horizontally reading the content from each of the plurality of display screens, starting from a left side and continuing across to a right side, and
the second opening direction of the content (i) indicates that the direction for turning the plurality of display screens is from left to right and (ii) is for (a) vertically reading the content from each of the display screens, starting from an uppermost portion of the fight side and continuing down to a bottommost portion of the right side or (b) horizontally reading the content from each of the display screens, starting from the right side and continuing across to the left side; and a display control unit arranging and displaying the content based on the first opening direction of the content and the second opening direction of the content, wherein the display control unit arranges and displays the content in an ascending order of the plurality of display screens starting at the first display screen and continuing to the $n^{th}$ display screen, wherein the content is arranged and displayed in the ascending order of the plurality of display screens starting at the first display screen for both the first opening direction of the content and the second opening direction of the content, wherein the display control unit respectively reverses a top and a bottom of the displayed content in the first opening direction of the content from a top and a bottom of the displayed content in the second opening direction of the content, wherein, when the content is displayed in the first opening direction of the content to be read starting from the left side and continuing, across to the right side, the top and the bottom of the displayed content is reverse from the top and the bottom of the displayed content when the content is displayed in the second opening direction of the content to be read starting from the right side and continuing across to the left side or to be read starting from the uppermost portion of the right side and continuing down to the bottommost portion of the right side, wherein the content includes attribute information indicating an opening direction and a genre of the content, and wherein the opening-direction recognizing unit determines the opening direction of the content based on the opening direction and the genre indicated by the attribute information included in the content.

* * * * *